US012761764B2

(12) United States Patent
Kim et al.

(10) Patent No.: US 12,761,764 B2
(45) Date of Patent: Oct. 13, 2026

(54) SENSOR, METHOD AND DISPLAY DEVICE WITH DRIVING SIGNALS AND OFFSET SIGNALS ACCORDING TO ORIENTATION INFORMATION

(71) Applicant: Samsung Display Co., LTD., Yongin-si (KR)

(72) Inventors: Hyung Bae Kim, Yongin-si (KR); Sang Hyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/916,237

(22) Filed: Oct. 15, 2024

(65) Prior Publication Data

US 2025/0165106 A1 May 22, 2025

(30) Foreign Application Priority Data

Nov. 16, 2023 (KR) ........................ 10-2023-0159413

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05)

(58) Field of Classification Search
CPC ............... G06F 3/0446; G06F 3/04164; G06F 3/04166; G06F 3/0418; G09G 2330/06
See application file for complete search history.

(56) References Cited

U.S. PATENT DOCUMENTS

2016/0188105 A1* 6/2016 Kremin ................... G06F 3/041 345/174
2016/0216796 A1* 7/2016 Johansson ............. G06F 3/0412

FOREIGN PATENT DOCUMENTS

KR 10-2379057 B1 3/2022

* cited by examiner

*Primary Examiner* — Liliana Cerullo
(74) *Attorney, Agent, or Firm* — Womble Bond Dickinson (US) LLP

(57) ABSTRACT

A sensor device includes first sensors, second sensors, and a sensor driver. The first sensors are arranged along a first direction, and the second sensors are arranged along a second direction. The sensor driver is configured to transmit driving signals to the first sensors through first sensor lines and to receive sensing signals from the second sensors through second sensor lines. During a first period, the sensor driver is configured to transmit the driving signals to a first group of sensors, and to transmit offset signals having a frequency that is equal to that of the driving signals and a phase that is different from that of the driving signals to a second group of sensors. During a second period, the sensor driver is configured to transmit the offset signals to the first group of sensors and to transmit the driving signals to the second group of sensors.

20 Claims, 26 Drawing Sheets p3b = p4b

SENSOR, METHOD AND DISPLAY DEVICE WITH DRIVING SIGNALS AND OFFSET SIGNALS ACCORDING TO ORIENTATION INFORMATION

CROSS-REFERENCE TO RELATED APPLICATION

The present application claims priority to and the benefit of Korean Patent Application No. 10-2023-0159413, filed on Nov. 16, 2023, in the Korean Intellectual Property Office, the entire disclosure of which is incorporated by reference herein.

BACKGROUND

1. Field

The present disclosure relates to a sensor device, a display device including the same, and a method of operating the same.

2. Description of the Related Art

As information technology develops, importance of a display device, which is a connection medium between a user and information, has been highlighted. In response to this, a use of a display device such as a liquid crystal display device and an organic light emitting display device is increasing.

The display device may include a sensor device, and may sense a touch of a user corresponding to an image of the display device and use the touch as an input signal. At this time, a driving signal supplied to sensors of the sensor device may act as a noise to the display device, and thus display quality of the display device may be reduced. In addition, when another electronic device is positioned around the display device, electromagnetic interference (EMI) may be generated in the other electronic device when a driving signal supplied to the sensors of a sensor device is generated. The EMI may seriously affect an operation of the other electronic device.

SUMMARY

Aspects and features of embodiments of the present disclosure are to provide a sensor device capable of reducing or minimizing an electromagnetic interference (EMI) to another electronic device, a display device including the same, and a method of operating the same.

According to one or more embodiments of the present disclosure, a sensor device includes first sensors, second sensors, and a sensor driver. The first sensors are arranged along a first direction, and the second sensors are arranged along a second direction different from the first direction. The sensor driver is configured to transmit driving signals to the first sensors through first sensor lines and to receive sensing signals from the second sensors through second sensor lines. During a first period, the sensor driver is configured to transmit the driving signals to a first group of sensors from among the first sensors, and to transmit offset signals having a frequency that is equal to that of the driving signals and a phase that is different from that of the driving signals to a second group of sensors from among the first sensors. During a second period, the sensor driver is configured to transmit the offset signals to the first group of sensors and to transmit the driving signals to the second group of sensors. The sensor driver is configured to generate driving signals and the offset signals during the first and second periods based on orientation information of the sensor device.

In one or more embodiments, the orientation information may include information on whether the sensor device is placed horizontally or vertically in reference to a ground surface.

In one or more embodiments, a number of the first sensors may be greater than a number of the second sensors. When the first direction is closer to being parallel to a ground surface than the second direction, the orientation information may include information that the sensor device is placed horizontally. When the second direction is closer to being parallel to the ground surface than the first direction, the orientation information may include information that the sensor device is placed vertically.

In one or more embodiments, when the information that the sensor device is placed horizontally is included in the orientation information, during the first period, the sensor driver is configured to transmit the driving signals to h sensors from among the first sensors and to transmit the offset signals to q-h sensors from among the first sensors. During the second period, the sensor driver is configured to transmit the offset signals to the h sensors and to transmit the driving signals to the q-h sensors. Here, h may be a natural number greater than 1, and q may be a natural number greater than h.

In one or more embodiments, when the information that the sensor device is placed vertically is included in the orientation information, during the first period, the sensor driver is configured to transmit the driving signals to h' sensors, which are less than the h sensors, from among the first sensors, and to transmit the offset signals to q-h' sensors from among the first sensors. During the second period, the sensor driver is configured to transmit the offset signals to the h' sensors and to transmit the driving signals to the q-h' sensors. Here, h' may be a natural number less than h.

In one or more embodiments, when the information that the sensor device is placed vertically is included in the orientation information, during the first period, the sensor driver is configured to transmit the driving signals to h" sensors, which are greater than the h sensors, from among the first sensors and to transmit the offset signals to q-h" sensors from among the first sensors. During the second period, the sensor driver is configured to transmit the offset signals to the h" sensors and to transmit the driving signals to the q-h" sensors. Here, h" may be a natural number greater than h and less than q.

In one or more embodiments, when the information that the sensor device is placed horizontally is included in the orientation information, during the first period, the sensor driver is configured to transmit the driving signals to the first group of sensors and to transmit offset signals having a first voltage value to the second group of sensors. During the second period, the sensor driver is configured to transmit the offset signals having the first voltage value to the first group of sensors and to transmit the driving signals to the second group of sensors.

In one or more embodiments, when the information that the sensor device is placed vertically is included in the orientation information, during the first period, the sensor driver is configured to transmit the driving signals to the first group of sensors and to transmit offset signals having a second voltage value greater than the first voltage value to the second group of sensors. During the second period, the sensor driver is configured to transmit the offset signals having the first voltage value to the first group of sensors and to transmit the driving signals to the second group of sensors.

In one or more embodiments, when the information that the sensor device is placed horizontally is included in the orientation information, during the first period corresponding to a first time, the sensor driver is configured to transmit the driving signals to the first group of sensors and to transmit the offset signals to the second group of sensors. During the second period corresponding to a second time, the sensor driver is configured to transmit the offset signals to the first group of sensors and to transmit the driving signals to the second group of sensors. A length of the first time may be the same as a length of the second time.

In one or more embodiments, when the information that the sensor device is placed vertically is included in the orientation information, during the first period corresponding to a third time, the sensor driver is configured to transmit the driving signals to the first group of sensors and to transmit the offset signals to the second group of sensors. During the second period corresponding to a fourth time, the sensor driver is configured to transmit the offset signals to the first group of sensors and to transmit the driving signals to the second group of sensors. A length of the third time may be shorter than a length of the fourth time, and the length of the fourth time may be the same as the length of the second time.

A method of operating a sensor device according to one or more embodiments of the present disclosure is disclosed. The sensor device includes first sensors arranged along a first direction, second sensors arranged along a second direction different from the first direction, and a sensor driver configured to transmit driving signals to the first sensors through first sensor lines and to receive sensing signals from the second sensors through second sensor lines. The method of operating the sensor device includes receiving orientation information of the sensor device, determining a mode of the sensor device based on the orientation information, and performing a self-sensing operation of the sensor device based on the mode.

In one or more embodiments, when the orientation information indicates that the sensor device is placed horizontally, in determining the mode of the sensor device, it may be determined that the sensor device performs the self-sensing operation in a first mode.

In one or more embodiments, performing the self-sensing operation of the sensor device based on the mode may include during a first period, transmitting the driving signals to h sensors from among the first sensors and transmitting offset signals to q-h sensors from among the first sensors, and during a second period, transmitting the offset signals to the h sensors and transmitting the driving signals to the q-h sensors. Here, h may be a natural number greater than 1, and q may be a natural number greater than h.

In one or more embodiments, when the orientation information indicates that the sensor device is placed vertically, in determining the mode of the sensor device, it may be determined that the sensor device performs the self-sensing operation in a second mode.

In one or more embodiments, performing the self-sensing operation of the sensor device based on the mode may include during a first period, transmitting the driving signals to h' sensors from among the first sensors and transmitting the offset signals to q-h' sensors from among the first sensors, and during a second period, transmitting, by the sensor driver, the offset signals to the h' sensors and transmitting the driving signals to the q-h' sensors, and h' is greater than q/2. Here, h' may be a natural number greater than 1, and q may be a natural number greater than h.

In one or more embodiments, performing the self-sensing operation of the sensor device based on the mode may include during a first period, transmitting the driving signals to a first group of sensors and transmitting offset signals to a second group of sensors, and during a second period, transmitting offset signals having a first voltage value to the first group of sensors and transmitting the driving signals to the second group of sensors. A magnitude of the offset signals transmitted to the second group of sensors during the first period may be greater than a magnitude of the offset signals transmitted to the first group of sensors during the second period.

In one or more embodiments, performing the self-sensing operation of the sensor device based on the mode may include during a first period, transmitting the driving signals to a first group of sensors from among the first sensors and transmitting offset signals to a second group of sensors from among the first sensors, and during a second period, transmitting offset signals having a first voltage value to the first group of sensors and transmitting the driving signals to the second group of sensors. A length of the first period may be shorter than a length of the second period.

According to one or more embodiments of the present disclosure, a display device includes a plurality of pixels, first sensors, second sensors, a display driver, and a sensor driver. The first sensors are arranged along a first direction. Second sensors are arranged along a second direction different from the first direction. The display driver is configured to drive the plurality of pixels. The sensor driver is configured to transmit driving signals to the first sensors through first sensor lines and to receive sensing signals from the second sensors through second sensor lines. The sensor driver is configured to transmit the driving signals to a first group of sensors from among the first sensors, and to transmit offsets signals having a frequency that is equal to that of the driving signals and a phase that is different from that of the driving signals to a second group of sensors from among the first sensors. The sensor driver is configured to generate the driving signals and the offset signals based on orientation information of the sensor device.

In one or more embodiments, the orientation information may include information on whether the display device is placed horizontally or vertically in reference to a ground surface.

In one or more embodiments, when the display device is placed horizontally, the sensor driver is configured to transmit the driving signals to h sensors from among the first sensors, and to transmit the offset signals to q-h sensors from among the first sensors. When the display device is placed vertically, the sensor driver is configured to transmit the driving signals to h' sensors, which are less than the h sensors, from among the first sensors, and to transmit the offset signals to q-h' sensors from among the first sensors. Here, h may be a natural number greater than 1, h' may be a natural number less than h, and q may be a natural number greater than h.

In accordance with the sensor device, the display device including the same, and the method of operating the same according to the disclosure, EMI to another electronic device may be reduced or minimized.

BRIEF DESCRIPTION OF DRAWINGS

The above and other aspects and features of embodiments of the present disclosure will become more apparent by describing in further detail embodiments thereof with reference to the accompanying drawings, in which.

DETAILED DESCRIPTION

Figure 1:
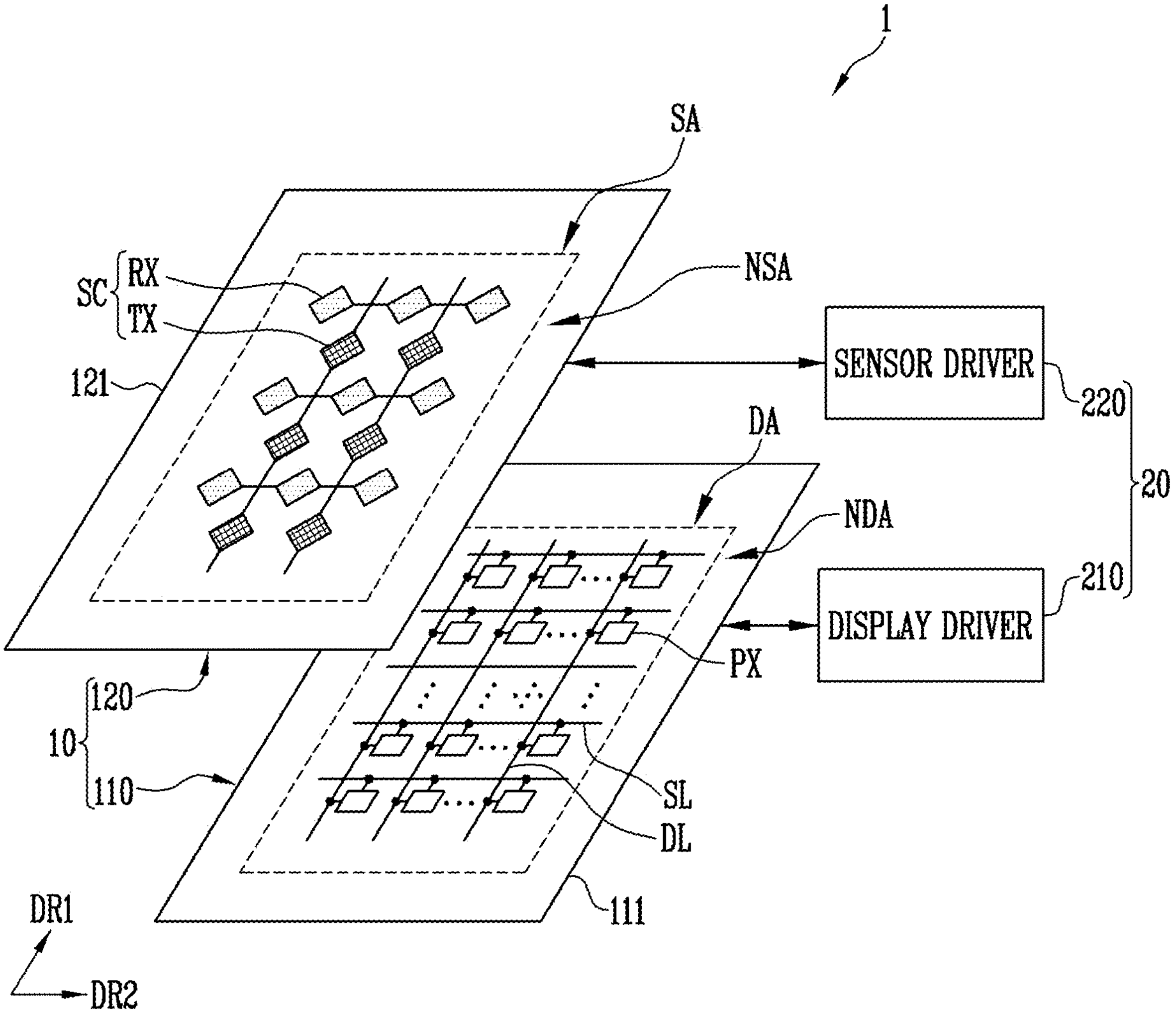
FIG. 1 is a diagram illustrating a display device according to one or more embodiments of the present disclosure.

Hereinafter, various embodiments of the present disclosure will be described in detail with reference to the accompanying drawings so that those skilled in the art may easily carry out the present disclosure. The present disclosure may be implemented in various different forms and is not limited to the embodiments described herein.

In order to clearly describe the present disclosure, parts that are not related to the description are omitted, and the same or similar elements are denoted by the same reference numerals throughout the present disclosure. Therefore, the above-described reference numerals may be used in other drawings.

In addition, sizes and thicknesses of each component shown in the drawings are arbitrarily shown for convenience of description, and thus the present disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

FIG. 1 is a diagram illustrating a display device according to one or more embodiments of the present disclosure.

Referring to FIG. 1, the display device 1 according to one or more embodiments of the present disclosure may include a panel 10 and a driving circuit 20 for driving the panel 10. For example, the panel 10 may include a display unit 110 for displaying an image and a sensor unit 120 for sensing touch, pressure, fingerprint, hovering, and/or the like. For example, the panel 10 may include pixels PX and sensors SC positioned to overlap at least a portion of the pixels PX. In one or more embodiments, the sensors SC may include first sensors TX and second sensors RX. In one or more embodiments (for example, in a self-capacitance method), the sensors SC may be configured as one type of sensors without distinction between the first sensor and the second sensor.

The driving circuit 20 may include a display driver 210 for driving the display unit 110 and a sensor driver 220 for driving the sensor unit 120. For example, the pixels PX may display an image in a display frame period unit. For example, the sensors SC may sense an input of a user in a sensing frame period unit. A sensing frame period and a display frame period may be independent of each other and may be different from each other. The sensing frame period and the display frame period may be synchronized with each other or may be asynchronous.

According to one or more embodiments, the display unit 110 and the sensor unit 120 may be separately manufactured, and then disposed and/or combined so that at least one area overlaps each other. Alternatively, in one or more embodiments, the display unit 110 and the sensor unit 120 may be integrally manufactured. For example, the sensor unit 120 may be directly formed on at least one substrate configuring the display unit 110 (for example, an upper substrate and/or a lower substrate of the display panel, or a thin film encapsulation layer), or other insulating layers or various types of functional layer (for example, an optical layer or a protective layer).

In FIG. 1, the sensor unit 120 is disposed on a front surface (for example, an upper surface on which an image is displayed) of the display unit 110, but a position of the sensor unit 120 is not limited thereto. For example, in one or more embodiments, the sensor unit 120 may be disposed on a back surface or both surfaces of the display unit 110. In one or more embodiments, the sensor unit 120 may be disposed on at least one edge area of the display unit 110.

The display unit 110 may include a display substrate 111 and a plurality of pixels PX formed on the display substrate 111. The pixels PX may be disposed in a display area DA of the display substrate 111.

The display substrate 111 may include the display area DA where an image is displayed and a non-display area NDA outside the display area DA and located around the display area along an edge or a periphery of the display area DA. According to one or more embodiments, the display area DA may be disposed in a center area of the display unit 110, and the non-display area NDA may be disposed in an edge area of the display unit 110 to be around (e.g., to surround) the display area DA.

The display substrate 111 may be a rigid substrate or a flexible substrate, and a material or a physical property thereof is not particularly limited. For example, the display substrate 111 may be a rigid substrate configured of organic or tempered glass, or a flexible substrate configured of a thin film of a plastic or metal material.

Scan line SL, data lines DL, and the pixels PX connected to the scan lines SL and the data lines DL are disposed in the display area DA. The pixels PX are selected by a scan signal of a turn-on level supplied from the scan lines SL, configured to receive a data signal from the data lines DL, and configured to emit light of a luminance corresponding to the data signal. Therefore, an image corresponding to the data signal is displayed in the display area DA. In the present disclosure, a structure, a driving method, and the like of the pixels PXL are not particularly limited. For example, each of the pixels PXL may be implemented with a pixel employing various currently known structures and driving methods.

In the non-display area NDA, various lines and/or a built-in circuit unit connected to the pixels PX of the display area DA may be disposed. For example, a plurality of lines for supplying various power and control signals to the display area DA may be disposed in the non-display area NDA, and a scan driver or the like may be further disposed in the non-display area NDA.

In the present disclosure, a type of the display unit 110 is not particularly limited. For example, the display unit 110 may be implemented as a self-emission type display panel such as an organic light emitting display panel. However, when the display unit 110 is implemented as a self-emission type, each pixel is not limited to a case where only an organic light emitting element is included. For example, the light emitting element of each pixel may be configured of an organic light emitting diode (OLED), an inorganic light emitting diode, a quantum dot and/or well light emitting diode, and/or the like. A plurality of light emitting elements may be provided in each pixel. At this time, the plurality of light emitting elements may be connected in series, parallel, series-parallel, and/or the like. Alternatively, the display unit 110 may be implemented as a non-emission type display panel such as a liquid crystal display panel. When the display unit 110 is implemented as a non-emission type, the display device 1 may additionally include a light source such as a backlight unit.

The sensor unit 120 includes a sensor substrate 121 and a plurality of sensors formed on the sensor substrate 121. The sensors SC may be disposed in a sensing area SA on the sensor substrate 121.

The sensor substrate 121 may include the sensing area SA in which a touch input and/or the like may be sensed, and a peripheral area NSA outside the sensing area SA along an edge or a periphery of the sensing area SA. According to one or more embodiments, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when the touch input or the like is provided on the display area DA, the touch input may be detected through the sensor unit 120.

The sensor substrate 121 may be a rigid or a flexible substrate, and may be configured of at least one insulating layer. In addition, the sensor substrate 121 may be a transparent or translucent light-transmitting substrate, but is not limited thereto. That is, in the present disclosure, a material and a physical property of the sensor substrate 121 are not particularly limited. For example, the sensor substrate 121 may be a rigid substrate configured of glass or tempered glass, or a flexible substrate configured of a thin film of a plastic or metal material. In addition, according to one or more embodiments, at least one substrate (for example, the display substrate 111, an encapsulation substrate, and/or a thin film encapsulation layer) configuring the display unit 110, an insulating layer, a functional layer, and/or the like of at least one layer disposed in an inside and/or on an outer surface of the display unit 110 may be used as the sensor substrate 121.

The sensing area SA is set as an area capable of responding to the touch input (that is, an active area of a sensor). To this end, the sensors SC for sensing the touch input and/or the like may be disposed in the sensing area SA. According to one or more embodiments, the sensors SC may include the first sensors TX and the second sensors RX.

For example, each of the first sensors TX may extend in a first direction DR1. The first sensors TX may be arranged to be spaced in a second direction DR2. The second direction DR2 may be different from the first direction DR1. For example, the second direction DR2 may be a direction orthogonal to the first direction DR1. In one or more embodiments, an extension direction and an arrangement direction of the first sensors TX may follow another conventional configuration. Each of the first sensors TX may have a form in which first cells of a relatively large area and first bridges of a relatively narrow area may be connected. In FIG. 1, each of the first cells is shown in a diamond shape, but each of the first cells may be configured in various conventional shapes such as a circle, a quadrangle, a triangle, and/or a mesh form. For example, the first bridges may be integrally formed on (e.g., at) the same layer as the first cells. In one or more embodiments, the first bridges may be formed on a layer different from that of the first cells and may electrically connect adjacent first cells.

For example, each of the second sensors RX may extend in the second direction DR2. The second sensors RX may be arranged to be spaced in the first direction DR1. In one or more embodiments, an extension direction and an arrangement direction of the second sensors RX may follow another conventional configuration. Each of the second sensors RX may have a form in which second cells of a relatively large area and second bridges of a relatively narrow area are connected. In FIG. 1, each of the second cells is shown in a diamond shape, but may be configured in various conventional shapes such as a circle, a quadrangle, a triangle, and a mesh form. For example, the second bridges may be integrally formed on (e.g., at) the same layer as the second cells. In one or more embodiments, the second bridges may be formed in a layer different from that of the second cells and may electrically connect adjacent second cells.

For example, the first cells of the first sensors TX and the second cells of the second sensors RX may be formed on the same conductive layer. At this time, the first bridges of the first sensors TX and the second bridges of the second sensors RX may be formed on different conductive layers with an insulating layer interposed therebetween. For example, when the first bridges of the first sensors TX are formed on (e.g., at) the same layer as the first cells and the second cells, the second bridges of the second sensors RX may be formed on another layer from the first bridges, the first cells, and the second cells with an insulating layer interposed therebetween. When the second bridges of the second sensors RX are formed on (e.g., at) the same layer as the first cells and the second cells, the first bridges of the first sensors TX may be formed on another layer from the second bridges, the first cells, and the second cells with an insulating layer interposed therebetween.

As another example, the first cells of the first sensors TX and the second cells of the second sensors RX may be formed on different conductive layers with an insulating layer interposed therebetween. At this time, the first cells and the first bridges of the first sensors TX may be formed on (e.g., at) the same conductive layer. In addition, the second cells and the second bridges of the second sensors RX may be formed on (e.g., at) the same conductive layer.

According to one or more embodiments, each of the first sensors TX and the second sensors RX may have conductivity by including at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), and/or platinum (Pt), and/or an alloy thereof. At this time, the first sensors TX and the second sensors RX may be configured in a mesh form. In addition, the first sensors TX and the second sensors RX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nano tube, graphene, and/or the like. In addition, the first sensors TX and the second sensors RX may have conductivity by including at least one of various conductive materials. In addition, each of the first sensors TX and the second sensors RX may be formed of a single layer or multiple layers, and a cross-sectional structure thereof is not particularly limited.

In one or more embodiments, sensor lines for electrically connecting the first and second sensors TX and RX to the sensor driver 220 and the like may be intensively disposed in the peripheral area NSA of the sensor unit 120.

The driving circuit 20 may include the display driver 210 for driving the display unit 110 and the sensor driver 220 for driving the sensor unit 120. In one or more embodiments, the display driver 210 and the sensor driver 220 may be configured of integrated chips (ICs) separated from each other. In one or more embodiments, at least a portion of the display driver 210 and the sensor driver 220 may be integrated together in one IC.

The display driver 210 is electrically connected to the display unit 110 to drive the pixels PX. For example, the display driver 210 may include the data driver and a timing controller, and the scan driver may be separately mounted in the non-display area NDA of the display 110. In one or more embodiments, the display driver 210 may include all or at least a portion of the data driver, the timing controller, and the scan driver.

The sensor driver 220 is electrically connected to the sensor unit 120 to drive the sensor unit 120. The sensor driver 220 may include a transmission block and a reception block. According to one or more embodiments, the transmission block and the reception block may be integrated into one IC, but are not limited thereto.

Figure 2:
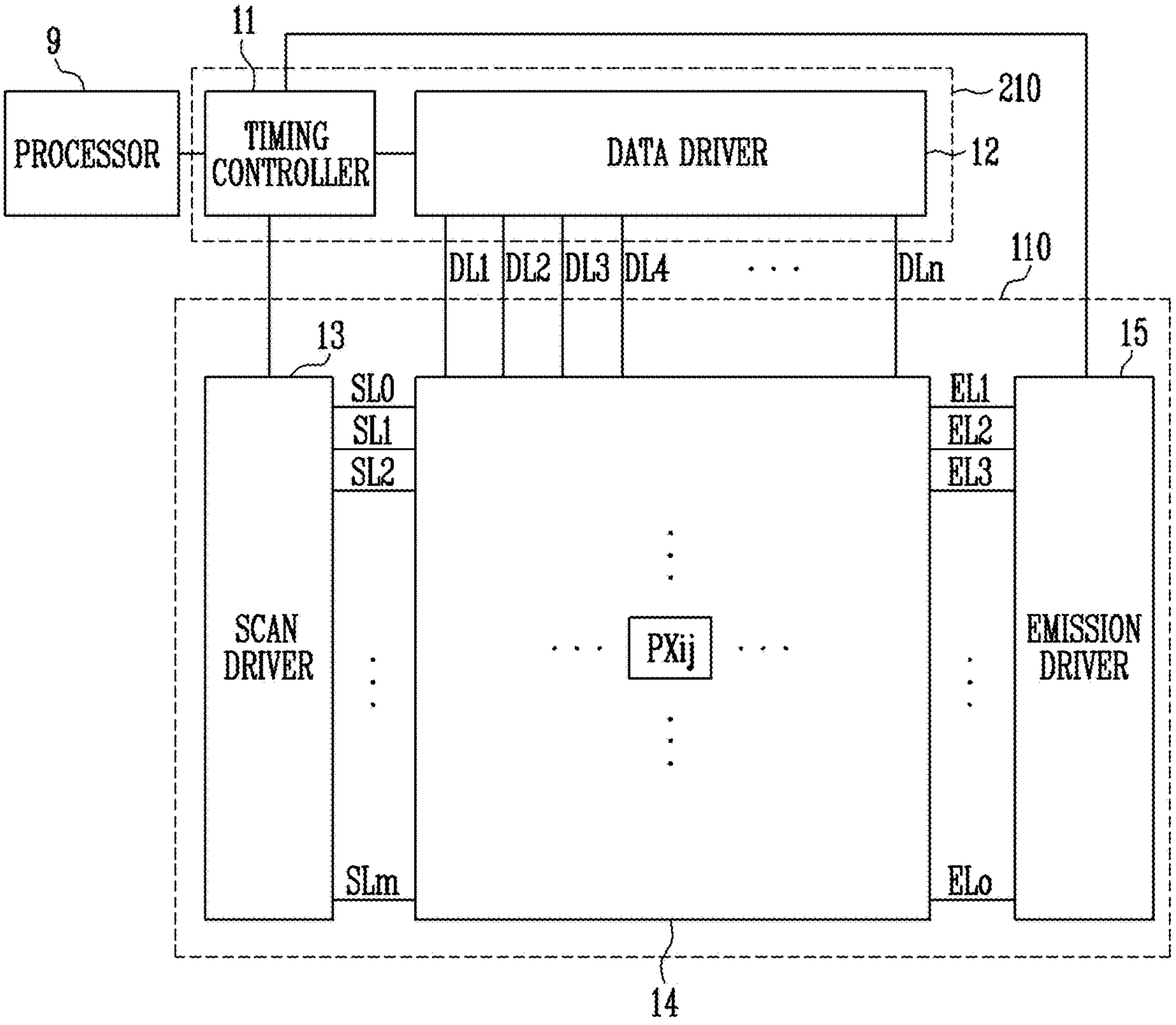
FIGS. 2-4 are diagrams illustrating a display unit and a display driver according to one or more embodiments of the present disclosure.
Figure 3:
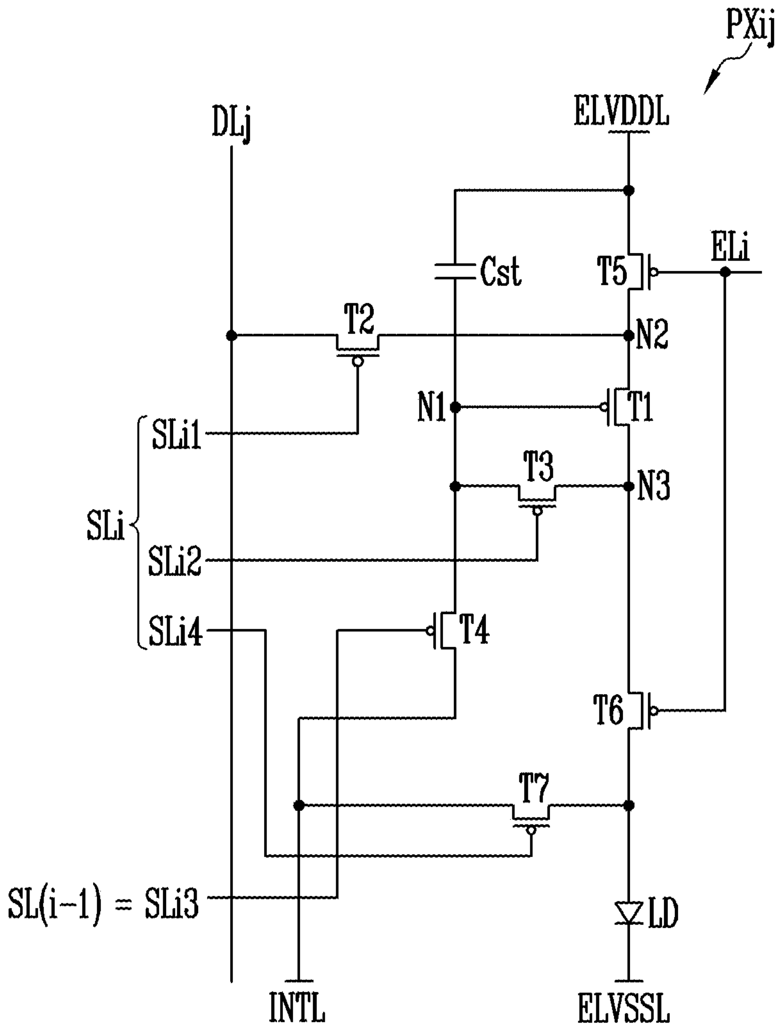
Figure 4:
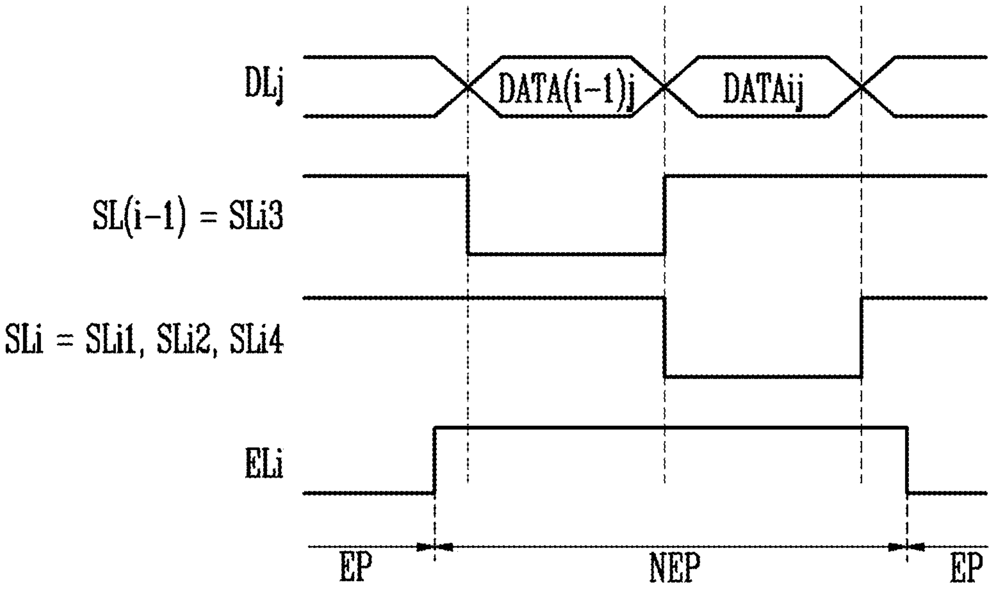

FIGS. 2-4 are diagrams illustrating a display unit and a display driver according to one or more embodiments of the present disclosure.

Referring to FIG. 2, the display driver 210 may include a timing controller 11 and a data driver 12, and the display unit 110 may include a scan driver 13, a pixel unit 14, and an emission driver 15. However, as described above, whether each functional unit is integrated into one IC, into a plurality of ICs, or mounted on the display substrate 111 may be variously configured according to one or more embodiments of the display device 1.

The timing controller 11 may receive grayscales (e.g., gray scale data or gray level data) and timing signals for each frame period from a processor 9. Here, the processor may correspond to at least one of a graphics processing unit (GPU), a central processing unit (CPU), and/or an application processor (AP). The timing signals may include a vertical synchronization signal, a horizontal synchronization signal, a data enable signal, and/or the like.

Each cycle of the vertical synchronization signal may correspond to each frame period. Each cycle of the horizontal synchronization signal may correspond to each horizontal period. The grayscales may be supplied in a horizontal line unit in each horizontal period in response to a pulse of an enable level of the data enable signal. The horizontal line may refer to pixels (for example, a pixel row) connected to the same scan line and emission line.

The timing controller 11 may render the grayscales to correspond to the specification of the display device 1. For example, the processor 9 may provide a red grayscale, a green grayscale, and a blue grayscale for each unit dot. For example, when the pixel unit 14 has an RGB stripe structure, the pixel may correspond to each grayscale one-to-one. In this case, rendering of the grayscales may be unnecessary. However, for example, when the pixel unit 14 has a PENTILE® structure, because adjacent unit dots share the pixel, the pixel may not correspond to each grayscale one-to-one. In this case, rendering of the grayscales may be necessary. PENTILE® is a registered trademark of Samsung Display Co., Ltd., Republic of Korea. The grayscales that are rendered or not rendered may be provided to the data driver 12.

In addition, the timing controller 11 may provide a data control signal to the data driver 12. In addition, the timing controller 11 may provide a scan control signal to the scan driver 13, and provide an emission control signal to the emission driver 15.

The data driver 12 may generate data voltages (that is, data signals) to be provided to data lines DL1, DL2, DL3, DL4, . . . , and DLn using the grayscales and the data control signal received from the timing controller 11. In this case, "n" may be an integer greater than 0.

The scan driver 13 may generate scan signals to be provided to scan lines SL0, SL1, SL2, . . . , and SLm using the scan control signal (for example, a clock signal, a scan start signal, and the like) received from the timing controller 11. The scan driver 13 may sequentially supply scan signals having a turn-on level of pulse to the scan lines SL0 to SLm. The scan driver 13 may include scan stages configured in a form of a shift register. The scan driver 13 may generate the scan signals in a method of sequentially transferring the scan start signal which is a pulse form of a turn-on level to a next scan stage under control of the clock signal. In this case, "m" may be an integer greater than 0.

The emission driver 15 may generate emission signals to be provided to emission lines EL1, EL2, EL3, . . . , and EL0 using the emission control signal (for example, a clock signal, an emission stop signal, and the like) received from the timing controller 11. The emission driver 15 may sequentially supply emission signals having a turn-off level of pulse to the emission lines EL1 to EL0. The emission driver 15 may include emission stages configured in a form of a shift register. The emission driver 15 may generate the emission signals in a method of sequentially transferring the emission stop signal that is a pulse form of a turn-off level to a next emission stage according to control of the clock signal. In this case, "o" may be an integer greater than 0.

The pixel unit 14 includes the pixels. Each pixel PXij may be connected to corresponding data line, scan line, and emission line. The pixels may include pixels configured to emit light of a first color, pixels configured to emit light of a second color, and pixels configured to emit light of a third color. The first color, the second color, and the third color may be different colors. For example, the first color may be one of red, green, and blue, the second color may be one other than the first color from among red, green, and blue, and the third color may be one other than the first color and the second color from among red, green, and blue. In addition, magenta, cyan, and yellow may be used instead of red, green, and blue as the first to third colors.

FIG. 3 is a diagram illustrating a pixel according to one or more embodiments of the present disclosure.

Referring to FIG. 3, the pixel PXij includes transistors T1, T2, T3, T4, T5, T6, and T7, a storage capacitor Cst, and a light emitting element LD. However, this is an example, and the number, a connection relationship, and the like of transistors, capacitors, and light emitting elements included in the pixel PXij are not limited thereto.

Hereinafter, a circuit configured of a P-type transistor is described as an example. However, those skilled in the art will be able to design a circuit configured of an N-type transistor by differentiating a polarity of a voltage applied to a gate terminal. Similarly, those skilled in the art will be able to design a circuit configured of a combination of a P-type transistor and an N-type transistor. The P-type transistor collectively refers to a transistor in which a current amount increases when a voltage difference between a gate electrode and a source electrode increases in a negative direction. The N-type transistor collectively refers to a transistor in which a current amount increases when a voltage difference between a gate electrode and a source electrode increases in a positive direction. The transistor may be configured in various forms such as a thin film transistor (TFT), a field effect transistor (FET), and a bipolar junction transistor (BJT).

The first transistor T1 may have a gate electrode connected to a first node N1, a first electrode connected to a second node N2, and a second electrode connected to a third node N3. The first transistor T1 may be referred to as a driving transistor.

The second transistor T2 may have a gate electrode connected to a scan line SLi1, a first electrode connected to a data line DLj, and a second electrode connected to the second node N2. The second transistor T2 may be referred to as a scan transistor (e.g., a switching transistor).

The third transistor T3 may have a gate electrode connected to a scan line SLi2, a first electrode connected to the first node N1, and a second electrode connected to the third node N3. The third transistor T3 may be referred to as a diode connection transistor. For example, when the third transistor T3 is on, the first transistor T1 may be diode-connected.

The fourth transistor T4 may have a gate electrode connected to a scan line SLi3, a first electrode connected to the first node N1, and a second electrode connected to an initialization line INTL. The fourth transistor T4 may be referred to as a gate initialization transistor. For example, when the fourth transistor T4 is on, the first node N1 or the gate electrode of the first transistor T1 may be initialized with an initialization voltage from the initialization line INTL.

The fifth transistor T5 may have a gate electrode connected to an i-th emission line Eli, a first electrode connected to a first power line ELVDDL, and a second electrode connected to the second node N2. The fifth transistor T5 may be referred to as an emission transistor. In one or more embodiments, the gate electrode of the fifth transistor T5 may be connected to an emission line different from an emission line connected to a gate electrode of the sixth transistor T6.

The sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In one or more embodiments, the gate electrode of the sixth transistor T6 may be connected to the emission line different from the emission line connected to the gate electrode of the fifth transistor T5.

The seventh transistor T7 may have a gate electrode connected to a scan line SLi4, a first electrode connected to the initialization line INTL, and a second electrode connected to the anode of the light emitting element LD. The seventh transistor T7 may be referred to as a light emitting element initialization transistor. For example, when the seventh transistor T7 is on, the anode of the light emitting element LD may be initialized with an initialization voltage from the initialization line INTL.

A first electrode of the storage capacitor Cst may be connected to the first power line ELVDDL and a second electrode may be connected to the first node N1.

The anode of the light emitting element LD may be connected to the second electrode of the sixth transistor T6 and a cathode may be connected to a second power line ELVSSL. The light emitting element LD may be a light emitting diode. The light emitting element LD may be configured of an organic light emitting element (organic light emitting diode (OLED)), an inorganic light emitting element (inorganic light emitting diode), a quantum dot/well light emitting element (quantum dot/well light emitting diode), or the like. The light emitting element LD may emit light in any one of the first color, the second color, and the third color. In addition, although only one light emitting element LD is provided in each pixel in the present embodiment, a plurality of light emitting elements may be provided in each pixel in one or more embodiments. At this time, the plurality of light emitting elements may be connected in series, parallel, series-parallel, and/or the like.

The first power line ELVDDL may be supplied with a first power voltage, the second power line ELVSSL may be supplied with a second power voltage, and the initialization line INTL may be supplied with an initialization voltage. For example, the first power voltage may be greater than the second power voltage. For example, the initialization voltage may be equal to or greater than the second power voltage. For example, the initialization voltage may correspond to a data voltage of the smallest voltage from among data voltage that may be provided. In another example, a magnitude of the initialization voltage may be less than a magnitude of the data voltages that may be provided.

FIG. 4 is a diagram illustrating a method of driving the pixel of FIG. 3.

Hereinafter, for convenience of description, it is assumed that the scan lines SLi1, SLi2, and SLi4 are i-th scan lines SLi and the scan line SLi3 is an (i−1)-th scan line SL(i−1). However, a connection relationship of the scan lines SLi1, SLi2, SLi3, and SLi4 may be various according to one or more embodiments. For example, the scan line SLi4 may be the (i−1)-th scan line or an (i+1)-th scan line.

First, an emission signal of a turn-off level (e.g., a logic high level) is applied to the i-th emission line ELi, a data voltage DATA(i−1) j for an (i−1)-th pixel is applied to the data line DLj, and a scan signal of a turn-on level (e.g., a logic low level) is applied to the scan line SLi3. The high/low of the logic level may vary according to whether a transistor is a P-type or an N-type.

At this time, because a scan signal of a turn-off level is applied to the scan lines SLi1 and SLi2, the second transistor T2 is turned off and the data voltage DATA(i−1) j is prevented from being input to the pixel PXij.

At this time, because the fourth transistor T4 is turned on, the first node N1 is connected to the initialization line INTL, and a voltage of the first node N1 is initialized. Because the emission signal of the turn-off level is applied to the emission line Ei, the transistors T5 and T6 are turned off, and unnecessary light emission of the light emitting element LD according to an initialization voltage application process is prevented.

Next, a data voltage DATAij for the i-th pixel PXij is applied to the data line DLj, and the scan signal of the turn-on level is applied to the scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data voltage DATAij is applied to the second electrode of the storage capacitor Cst (that is, the first node N1), and the storage capacitor Cst maintains a voltage corresponding to a difference between the first power voltage and the compensation voltage. Such a period may be referred to as a threshold voltage compensation period or a data writing period.

In addition, when the scan line SLi4 is the i-th scan line, because the seventh transistor T7 is turned on, the anode of the light emitting element LD and the initialization line INTL are connected with each other, and the light emitting element LD is initialized to a charge amount corresponding to a voltage difference between the initialization voltage and the second power voltage.

Thereafter, as the emission signal of the turn-on level is applied to the i-th emission line ELi, the transistors T5 and T6 may be turned on. Therefore, a driving current path connecting the first power line ELVDDL, the fifth transistor T5, the first transistor T1, the sixth transistor T6, the light emitting element LD, and the second power line ELVSSL is formed.

A driving current amount flowing to the first electrode and the second electrode of the first transistor T1 is adjusted according to the voltage maintained in the storage capacitor Cst. The light emitting element LD emits light with a luminance corresponding to the driving current amount. The light emitting element LD emits light until the emission signal of the turn-off level is applied to the emission line Ei.

When the emission signal is in the turn-on level, pixels receiving the corresponding emission signal may be in a display state. Therefore, a period in which the emission signal is in the turn-on level may be referred to as an emission period EP (or an emission allowable period). In addition, when the emission signal is in the turn-off level, pixels receiving the corresponding emission signal may be in a non-display state. Therefore, a period in which the emission signal is in the turn-off level may be referred to as a non-emission period NEP (or an emission disallowable period).

The non-emission period NEP described with reference to FIG. 4 is for preventing the pixel PXij from emitting light with an undesired luminance during the initialization period and the data writing period.

One or more non-emission periods NEP may be additionally provided while data written to the pixel PXij is maintained (for example, one frame period). This may be for effectively expressing a low grayscale by reducing the emission period EP of the pixel PXij, or for smoothly blurring a motion of an image.

Figure 5:
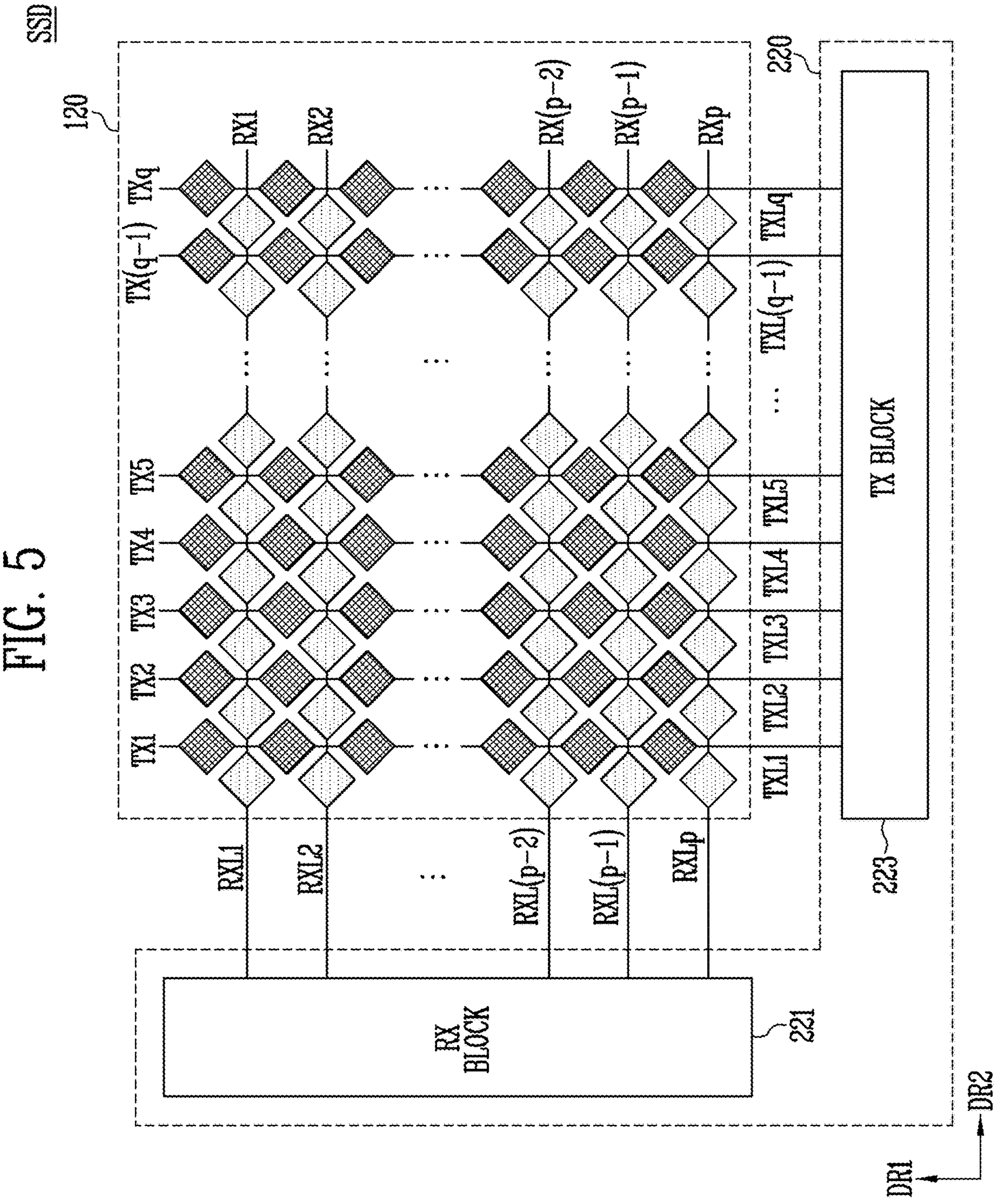
FIG. 5 is a diagram illustrating a sensor device according to one or more embodiments of the present disclosure.

FIG. 5 is a diagram illustrating a sensor device according to one or more embodiments of the present disclosure.

Referring to FIG. 5, the sensor device SSD according to one or more embodiments of the present disclosure may include the sensor unit 120 and the sensor driver 220. The sensor device SSD may be included in the display device 1.

The sensor unit 120 may include first sensors TX1, TX2, TX3, . . . , TX(q−1), and TXq and second sensors RX1, RX2, . . . , RX(p−2), RX(p−1), and RXp. Each of p and q may be an integer greater than 0. The first sensors TX1 to TXq may extend in the first direction DR1 and may be arranged to be spaced in the second direction DR2. The second sensors RX1 to RXp may extend in the second direction DR2 and may be arranged to be spaced in the first direction DR1 and parallel to each other.

The second sensors RX1 to RXp may cross the first sensors TX1 to TXq. The second sensors RX1 to RXp may form a mutual capacitance with first sensors TX1 to TXq. The sensor driver 220 may sense a change of capacitances and determine whether or not a touch of a user is input.

The sensor driver 220 may include a reception block 221 and a transmission block 223. The transmission block 223 may be connected to the first sensors TX1 to TXq and configured to supply driving signals to the first sensors TX1 to TXq. The transmission block 223 may be connected to the first sensors TX1 to TXq through first sensor lines TXL1, TXL2, TXL3, . . . , TXL(q−1), and TXLq.

The reception block 221 may be connected to the second sensors RX1 to RXp and configured to receive sensing signals from the second sensors RX1 to RXp. The reception block 221 may be connected to the second sensors RX1 to RXp through second sensor lines RXL1, RXL2, . . . , RXL(p−2), RXL(p−1), and RXLp.

In one or more embodiments, the number of first sensors TX1 to TXq may be different from the number of second sensors RX1 to RXp. For example, in one or more embodiments, the number of first sensors TX1 to TXq may be greater than the number of second sensors RX1 to RXp. In this case, the sensor device SSD may have a rectangular shape rather than a square shape, and horizontal and vertical lengths may be different.

Figure 6:
FIG. 6 is a diagram illustrating a detailed section of a sensing operation according to one or more embodiments of the present disclosure.

FIG. 6 is a diagram illustrating a detailed section of a sensing operation according to one or more embodiments of the present disclosure. Referring to FIG. 6, the sensing operation of the sensor unit 120 may be divided into a self-sensing section, a mutual sensing section, and a processing section.

In the mutual sensing section, the transmission block 223 of the sensor driver 220 may determine present or absence of a touch applied to the display device 1 and a position thereof, by sequentially applying a driving signal to the first sensor lines TXL1, TXL2, TXL3, . . . , TXL(q−1), and TXLq and receiving a sensing signal through the second sensor lines RXL1, RXL2, . . . , RXLp−2, RXLp−1, and RXLp.

In the self-sensing section, the transmission block 223 of the sensor driver 220 may determine the present or absence of the touch applied to the display device by concurrently (e.g., simultaneously) applying the driving signal to at least two sensor lines from among the first sensor lines TXL1, TXL2, TXL3, . . . , TXL(q−1), and TXLq and sensing a voltage waveform of the sensor lines to which the driving signal is applied. That is, in the self-sensing section, the sensor device SSD may determine whether the touch is applied to the display device 1 by sensing a change in a self-capacitance of sensors corresponding to at least two sensor lines to which the driving signal is applied.

In the processing section, a touch sensed in the self-sensing section and the mutual sensing section may be processed.

Figure 7:
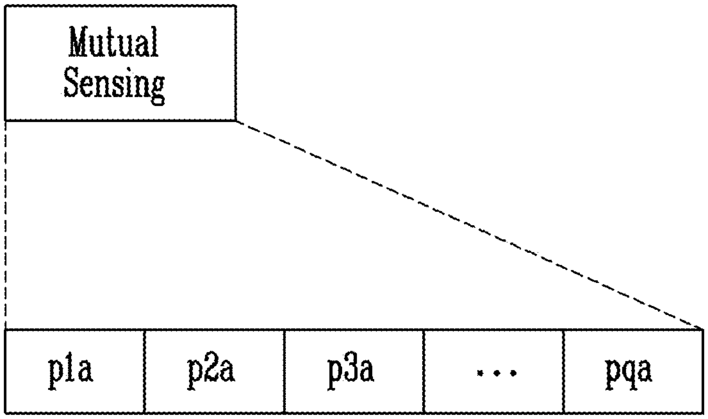
FIG. 7 is a diagram illustrating a mutual sensing section shown in FIG. 6 in more detail.

FIG. 7 is a diagram illustrating the mutual sensing section shown in FIG. 6 in more detail. Referring to FIG. 7, the mutual sensing section may include a plurality of periods p1*a*, p2*a*, p3*a*, . . . , and pqa. In one or more embodiments, the number of periods p1*a*, p2*a*, p3*a*, . . . , and pqa included in the mutual sensing section may correspond to the number of first sensors TX1, TX2, TX3, . . . , and TXq shown in FIG. 5. A mutual sensing operation of the sensor device performed in the plurality of periods p1*a*, p2*a*, p3*a*, . . . , and pqa included in the mutual sensing section is described in more detail with reference to FIG. 8.

Figure 8A:
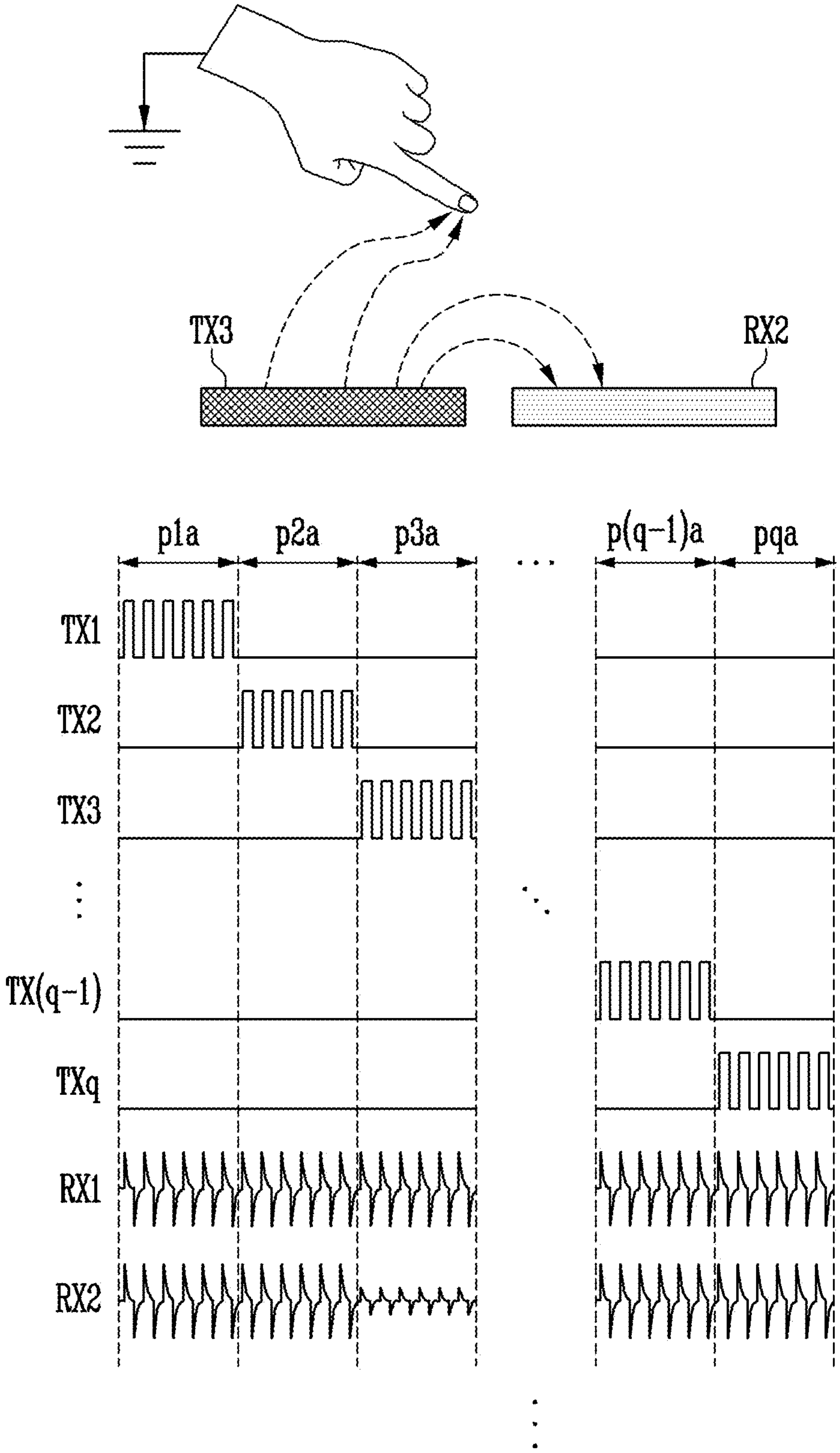
FIG. 8A is a diagram illustrating a mutual sensing operation of a sensor device in the mutual sensing section shown in FIG. 6 or FIG. 7.

FIG. 8A is a diagram illustrating an embodiment of the mutual sensing operation of the sensor device in the mutual sensing section shown in FIG. 6 or FIG. 7. Specifically, FIG. 8A shows a mutual sensing method of a time division multiplexing (TDM) method.

The sensor driver 220 may transmit the driving signals to the first sensors TX1 to TXq through the first sensor lines TXL1 to TXLq, and receive the sensing signals from the second sensors RX1 to RXp through the second sensor lines RXL1 to RXLp.

For example, the driving signals alternating between a high level and a low level (e.g., driving signal pulses) may be sequentially applied to the first sensors TX1 to TXq. During the period p1*a*, the sensor driver 220 may apply the driving signal alternating the high level and the low level to the first sensor TX1 and may not apply the driving signal to the other first sensors TX2 to TXq. Next, during the period p2*a*, the sensor driver 220 may apply the driving signal alternating the high level and the low level to the first sensor TX2 and may not apply the driving signal to the other first sensors TX1 and TX3 to TXq. Next, during the period p3*a*, the sensor driver 220 may apply the driving signal alternating the high level and the low level to the first sensor TX3, and may not apply the driving signal to other first sensors TX1, TX2, TX4 . . . , TX (q−1), and TXq. Thereafter, when the period p (q−1) a arrives, the sensor driver 220 may apply the driving signal alternating the high level and the low level to the first sensor TX (q−1), and may not apply the driving signal to the other first sensor TX1 to TX3, . . . , and TXq. Next, during the period pqa, the sensor driver 220 may apply the driving signal alternating the high level and the low level to the first sensor TXq, and may not apply the driving signal to the other first sensors TX1 to TX (q−1).

At this time, it is assumed that a user touches an intersection of the first sensor TX3 and the second sensor RX2 with a finger. In this case, a capacitance between the first sensor TX3 and the second sensor RX2 may be reduced, and thus a magnitude of the sensing signal received from the second sensor RX2 may be reduced during the period p3*a* in which the driving signal is applied to the first sensor TX3. Therefore, the sensor driver 220 may determine which portion of the display device 1 the user touches.

Figure 8B:
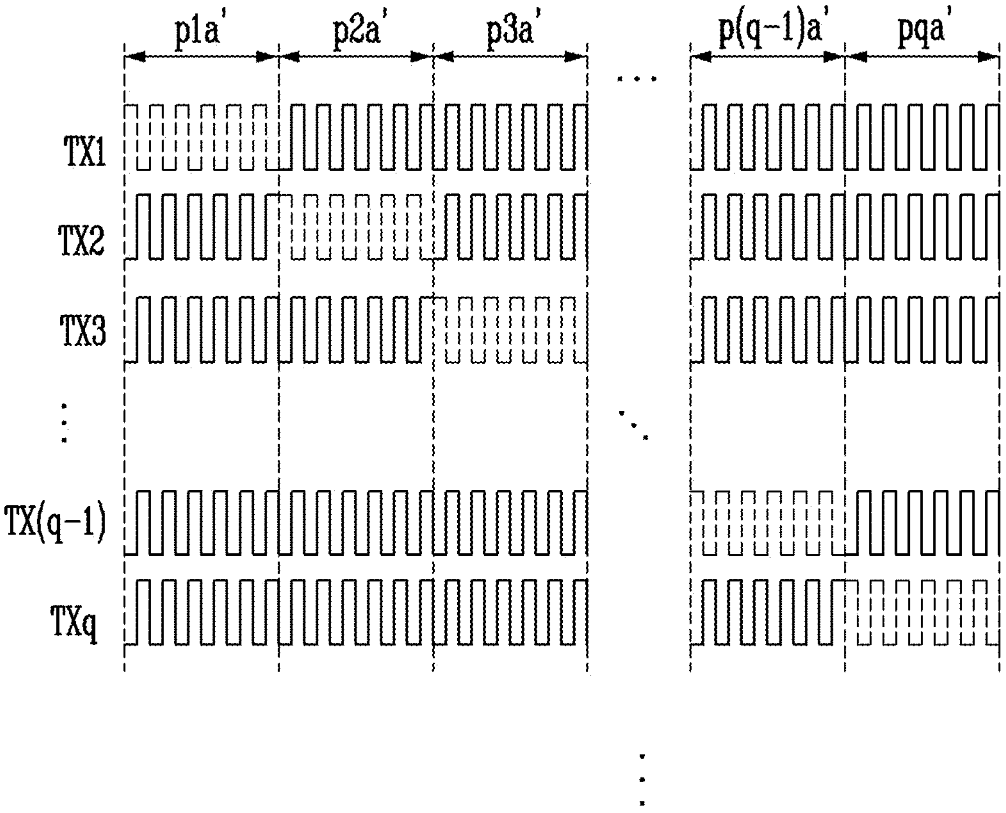
FIG. 8B is a diagram illustrating another embodiment of the mutual sensing operation of the sensor device in the mutual sensing section shown in FIG. 6 or FIG. 7.

FIG. 8B is a diagram illustrating another embodiment of the mutual sensing operation of the sensor device in the mutual sensing section shown in FIG. 6 or FIG. 7. Specifically, FIG. 8B shows a mutual sensing method of a code division multiplexing (CDM) method.

According to the embodiment shown in FIG. 8A, while the driving signal is applied to one of the first sensors TX1 to TXq during one of the periods p1*a* to pqa, the driving signal is not applied to the other sensors. On the other hand, according to the embodiment shown in FIG. 8B, the driving signal is concurrently (e.g., simultaneously) applied to the first sensors TX1 to TXq during periods p1*a*' to pqa'. In one or more embodiments, the driving signals applied to the first sensors TX1 to TXq in each of the periods p1*a*' to pqa' may configure different codes for each period.

Referring to FIG. 8B, the driving signal is applied to all of the first sensors TX1 to TXq during the period p1*a*'. In one or more embodiments, during the period p1*a*', the driving signal applied to the first sensor TX1 from among the first sensors TX1 to TXq and the driving signal applied to the remaining first sensors TX2 to TXq have the same frequency and different phases. For example, during the period p1*a*', the driving signal applied to the first sensor TX1 from among the first sensors TX1 to TXq and the driving signal applied to the remaining first sensors TX2 to TXq may have a phase difference of 180 degrees. However, this is an example, and a phase difference between the driving signals may have a value other than 180 degrees.

During the period p1*a*', the driving signal applied to the first sensor TX1 and the driving signal applied to the remaining first sensors TX2 to TXq may indicate different code values. For example, during the period p1*a*', the driving signal applied to the first sensor TX1 may indicate “1”, and the driving signal applied to the remaining first sensors TX2 to TXq may indicate “0”. The driving signal applied to the first sensors TX1 to TXq during the period p1*a*' may be “1 0 0 0 . . . 0” when the driving signal is indicated as a code.

In the embodiment of FIG. 8B, the driving signal shown by a dotted line may indicate "1", and the driving signal shown by a solid line may indicate "0".

In one or more embodiments, during the period p2*a*', the driving signal applied to the first sensor TX2 from among the first sensors TX1 to TXq and the driving signal applied to the remaining first sensors TX1 and TX3 to TXq may have the same frequency and different phases. As in the period p1*a*', the driving signal applied to the first sensors TX1 to TXq during the period p2*a*' may be "0 1 0 0 . . . 0" when the driving signal is indicated as a code.

In the method described above, the mutual sensing operation may be performed by applying driving signals having different codes to the first sensors TX1 to TXq in each period.

The mutual sensing method of the TDM method shown in FIG. 8A may be implemented with hardware having low complexity, and thus a manufacturing cost may be reduced. In addition, because the driving signal is applied to only one first sensor in each period, it is desirable in terms of power consumption. On the other hand, the mutual sensing method of the TDM method shown in FIG. 8A may be affected by noise.

Because the mutual sensing method of the CDM method shown in FIG. 8B transmits the driving signal to the first sensors in a form having a unique code for each reception channel, the mutual sensing method of the CDM method may be relatively robust against noise. However, because of limited available code, efficiency may be reduced according to the number of channels.

Figure 9:
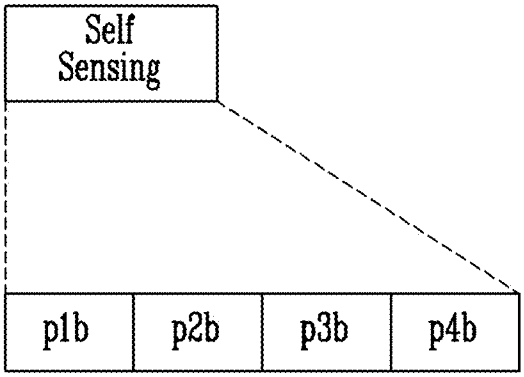
FIG. 9 is a diagram illustrating a self-sensing section shown in FIG. 6 in more detail.

FIG. 9 is a diagram illustrating the self-sensing section shown in FIG. 6 in more detail. Referring to FIG. 9, the self-sensing section may include a plurality of periods p1*b*, p2*b*, p3*b*, and p4*b*. In one or more embodiments, each of the plurality of periods p1*b*, p2*b*, p3*b*, and p4*b* included in the self-sensing section may correspond to a divided area of the sensor device. Hereinafter, the present disclosure is described in more detail with reference to FIGS. 10A, 10B, and 10C.

Figure 10A:
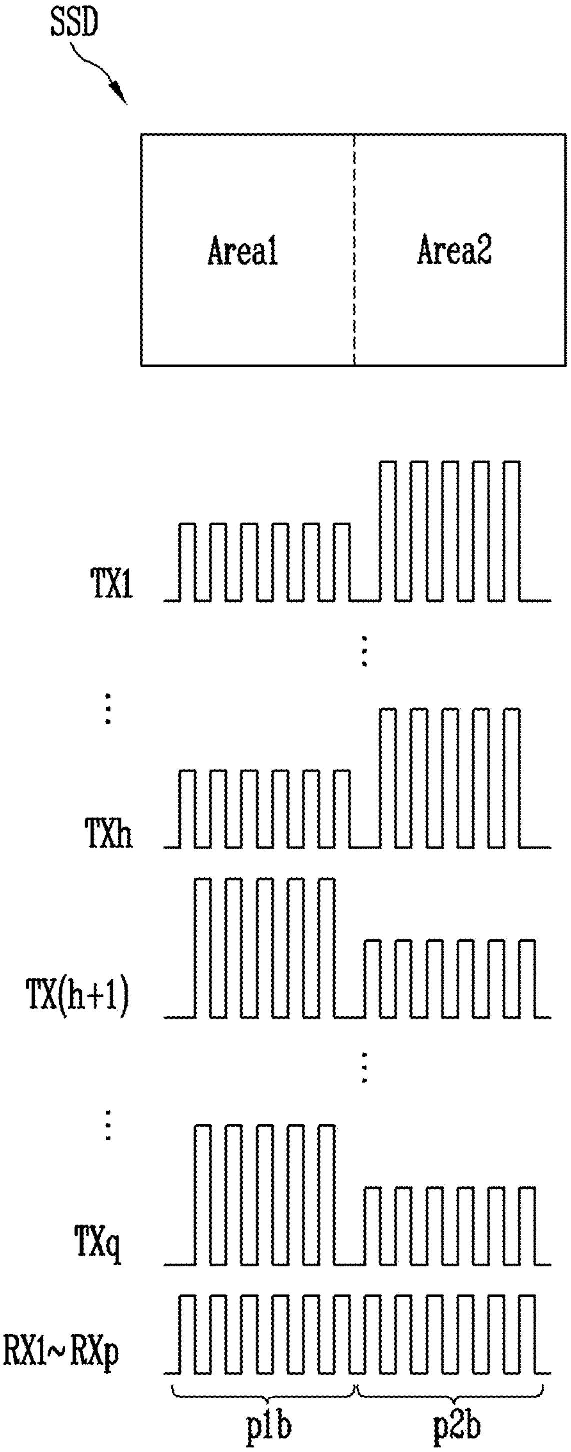
FIGS. 10A, 10B, and 10C are diagrams illustrating a self-sensing operation of the sensor device in the self-sensing section shown in FIG. 6 or FIG. 9.
Figure 10B:
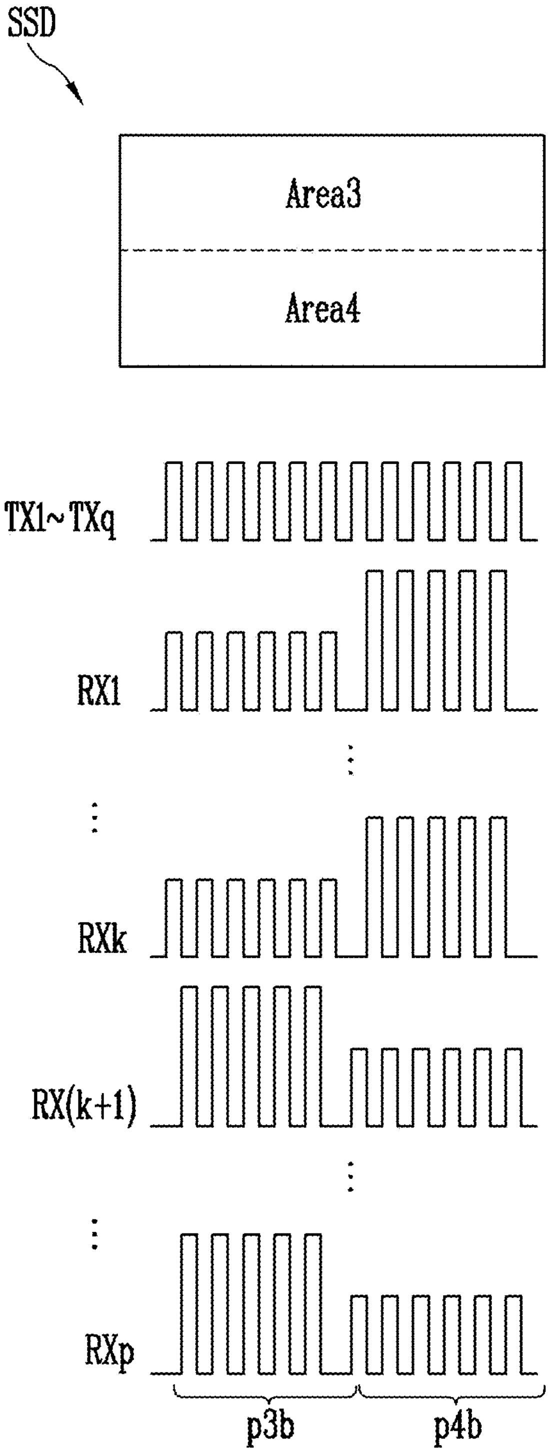
Figure 10C:
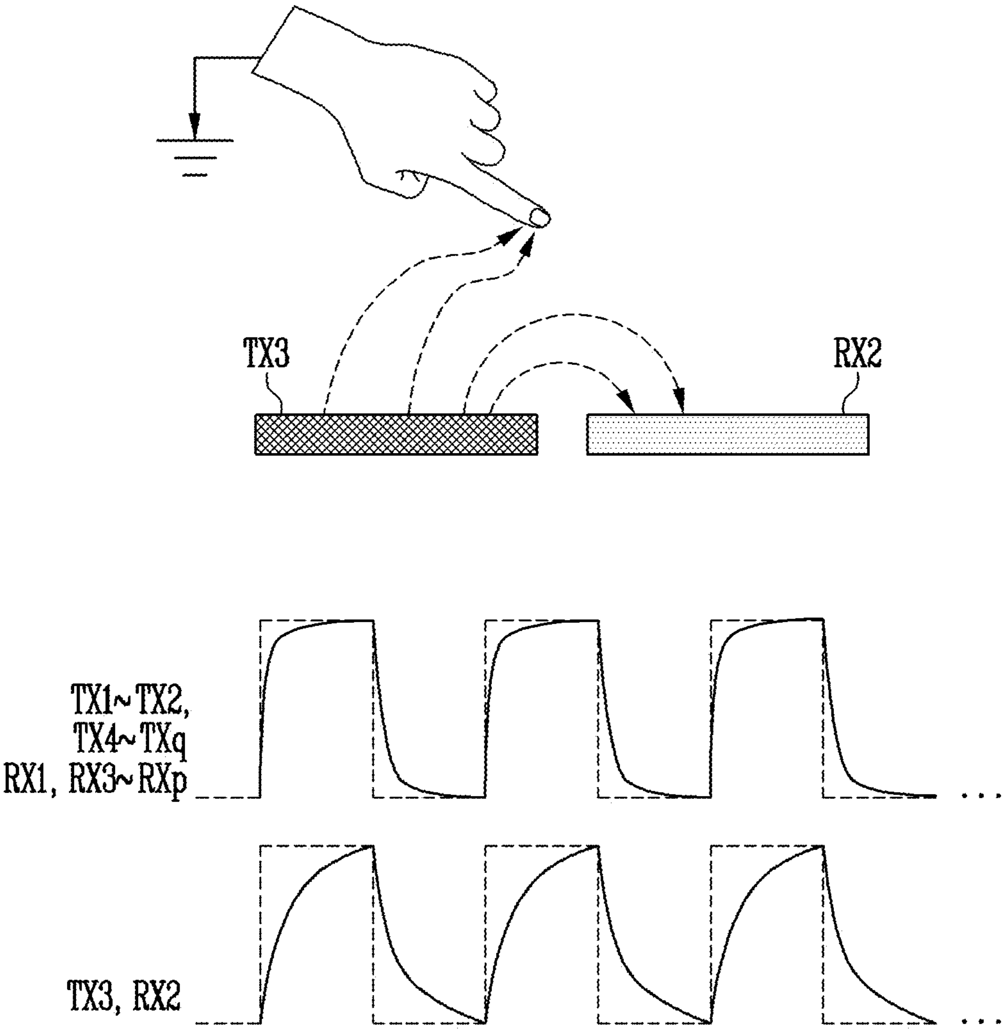

FIGS. 10A, 10B, and 10C are diagrams illustrating the self-sensing operation of the sensor device in the self-sensing section shown in FIG. 6 or FIG. 9.

Referring to FIG. 10A, the sensor device SSD may be divided into two areas Area1 and Area2. According to one or more embodiments of the present disclosure, self-sensing operations for the two areas Area1 and Area2 may be sequentially performed in the self-sensing section. When the self-sensing operations is performed concurrently (e.g., simultaneously) for both of the areas Area1 and Area2, because EMI generated by the driving signal becomes too large, the self-sensing operations may be performed sequentially with respect to each of the two areas Area1 and Area2 of the sensor device SSD, and sensors of an area where the self-sensing operation is not performed may perform an offset operation.

More specifically, the self-sensing operation for the area Area1 may be performed sequentially in the period p1*b*. To this end, the sensor driver 220 may transmit the driving signals to a first group of first sensors TX1 to TXh corresponding to the area Area1 from among the first sensors TX1 to TXq. In one or more embodiments, an offset operation for the area Area2 may be performed in the period p1*b*. To this end, the sensor driver 220 may transmit offset signals to a second group of first sensors TX(h+1) to TXq corresponding to the area Area2 from among the first sensors TX1 to TXq. As described above, the offset signals may be signals of which a frequency is equal to that of the driving signals and a phase is different from that of the driving signals. Here, h may be a natural number greater than 1, and q may be a natural number greater than h.

In addition, in order to effectively perform the offset operation for the area Area2, the sensor driver 220 may transmit dummy signals to the second sensors RX1 to RXp in the period p1*b*. The dummy signals transmitted to the second sensors RX1 to RXp may be signals of which a frequency and a phase are equal to those of the driving signals transmitted to the first group of first sensors TX1 to TXh corresponding to the area Area1 from among the first sensor lines TXL1 to TXLq. Referring to FIG. 5 together, the reception block 221 of the sensor driver 220 may transmit the dummy signals to the second sensors RX1 to RXp. In this case, the reception block 221 may perform substantially the same function as the transmission block 223, that is, a function of generating the dummy signal and transferring the dummy signal to the sensor.

Because the driving signal transmitted to the first sensors TX1 to TXh and the dummy signal transmitted to the second sensors RX1 to RXp in the period p1*b* have the same phase and frequency, a magnitude of the offset signals transmitted to the second group of first sensors TX(h+1) to TXq may be greater than a magnitude of the driving signals or the dummy signals.

Through this, the sensor device SSD may sense whether a touch is generated on the display device 1 in the area Area1 during the period p1*b*.

Thereafter, a self-sensing operation for the area Area2 may be performed in the period p2*b*. To this end, the sensor driver 220 may transmit the driving signals to the second group of first sensors TX(h+1) to TXq corresponding to the area Area2 among the first sensors TX1 to TXq. In one or more embodiments, an offset operation for the area Area1 may be performed in the period p2*b*. To this end, the sensor driver 220 may transmit the offset signals to the first group of first sensors TX1 to TXh corresponding to area Area1 from among the first sensors TX1 to TXq.

In addition, in order to effectively perform an offset operation for the area Area2, the sensor driver 220 may transmit the dummy signals to the second sensors RX1 to RXp in the period p2*b*.

As in the period p1*b*, because the driving signal transmitted to the second group of first sensors TX(h+1) to TXq and the dummy signals transmitted to the second sensors RX1 to RXp in the period p2*b* have the same phase and frequency, the magnitude of the offset signals transmitted to the first group of first sensors TX1 to TXh may be greater than the magnitude of the driving signals or the dummy signals.

Through this, the sensor device SSD may sense whether a touch is generated on the display device 1 in the area Area2 during the period p2*b*.

Referring to FIG. 10B, the sensor device SSD may be divided into two areas Area3 and Area4. Differently from the case where the sensor device SSD is divided into the two areas Area1 and Area2 of a horizontal direction in FIG. 10A, the sensor device SSD may be divided into the two areas Area3 and Area4 of a vertical direction in FIG. 10B. According to one or more embodiments of the present disclosure, self-sensing operations for the two areas Area3 and Area4 may be sequentially performed in the self-sensing section. When the self-sensing operations are performed concurrently (e.g., simultaneously) with respect to both of the areas Area3 and Area4, because EMI generated by the driving signal becomes too large, the self-sensing operation may be performed sequentially with respect to each of the two areas Area3 and Area4 of the sensor device SSD, and sensors of an area where the self-sensing operation is not performed may perform the offset operation.

More specifically, a self-sensing operation for the area Area3 may be performed in the period p3*b*. To this end, the sensor driver 220 may transmit the driving signals to a first group of second sensors RX1 to RXk corresponding to the area Area3 from among the second sensors RX1 to RXp. Referring to FIG. 5 together, the reception block 221 of the sensor driver 220 may transmit the driving signals to the first group of second sensors RX1 to RXk. In this case, the reception block 221 may perform substantially the same function as the transmission block 223, that is, a function of generating the driving signal and transmitting the driving signal to the sensor. Here, k may be a natural number greater than 1, and p may be a natural number greater than k.

In one or more embodiments, an offset operation for the area Area4 may be performed in the period p3*b*. To this end, the sensor driver 220 may transmit the offset signals to a second group of second sensors RX(k+1) to RXp corresponding to the area Area4 from among the second sensors RX1 to RXp. As described above, the offset signals may be signals of which a frequency is equal to that of the driving signals and a phase is different from that of the driving signals. Referring to FIG. 5 together, the reception block 221 of the sensor driver 220 may transmit the offset signals to the second group of second sensors RX(k+1) to RXp.

In addition, in order to effectively perform the offset operation for the area Area4, the sensor driver 220 may transmit the dummy signals to the first sensors TX1 to TXq in the period p3*b*.

Through this, the sensor device SSD may sense whether a touch is generated on the display device 1 in the area Area3 during the period p3*b*.

Thereafter, a self-sensing operation for the area Area4 may be performed in the period p4*b*. To this end, the sensor driver 220 may transmit the driving signals to the second group of second sensors RX(k+1) to RXp corresponding to the area Area4 from among the second sensors RX1 to RXp.

In one or more embodiments, the offset operation on the area Area3 may be performed in the period p4*b*. To this end, the sensor driver 220 may transmit the offset signals to the first group of second sensors RX1 to RXk corresponding to the area Area3 from among the second sensors RX1 to RXp.

In addition, in order to effectively perform the offset operation for the area Area3, the sensor driver 220 may transmit the dummy signals to the first sensors TX1 to TXq in the period p4*b*.

Through this, the sensor device SSD may sense whether a touch is generated on the display device 1 in the area Area4 during the period p4*b*.

Synthesizing FIGS. 9, 10A, and 10B, the sensor device SSD may sequentially perform the self-sensing operation for the areas Area1, Area2, Area3, and Area4 in the periods p1*b*, p2*b*, p3*b*, and p4*b*.

Referring to FIG. 10C, it is assumed that the user touches an intersection of the first sensor TX3 and the second sensor RX2 with a finger. In this case, a slew rate of signals on the first sensor TX3 and the second sensor RX2 near an area where the touch is generated may become lower than a slew rate of signals on the remaining sensors TX1 to TX2, TX4 to TXq, RX1, and RX3 to RXp. The sensor driver 220 may determine whether the touch is generated on the display device 1 by sensing a change of the slew rate.

Figure 11:
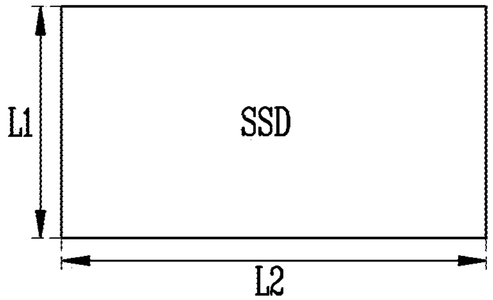
FIG. 11 is a diagram illustrating short and long axis lengths of a sensor device SSD.

FIG. 11 is a diagram illustrating short and long axis lengths of the sensor device SSD. As described above with reference to FIG. 5, the sensor device SSD may have the rectangular shape rather than the square shape, and the length of the short axis L1 and the long axis L2 may be different. For example, when the number of first sensors TX1 to TXq shown in FIG. 5 is greater than the number of second sensors RX1 to RXp, the length of the long axis L2 of the sensor device SSD may be longer than the length of the short axis L1. When the lengths of the long axis and the short axis of the sensor device SSD are different, an effect of EMI on a peripheral device may be different according to whether the sensor device SSD is placed horizontally or vertically in reference to a ground surface. In the present disclosure, an expression "the sensor device SSD is placed horizontally" means that the sensor device SSD is placed in a state closer to a state in which the long axis L2 is parallel to the ground surface and the short axis L1 is perpendicular to the ground surface. In addition, in the present disclosure, an expression "the sensor device SSD is placed vertically" means that the sensor device SSD is placed in a state closer to a state in which the short axis L1 of the sensor device is parallel to the ground surface and the long axis L2 is perpendicular to the ground surface.

Figure 12A:
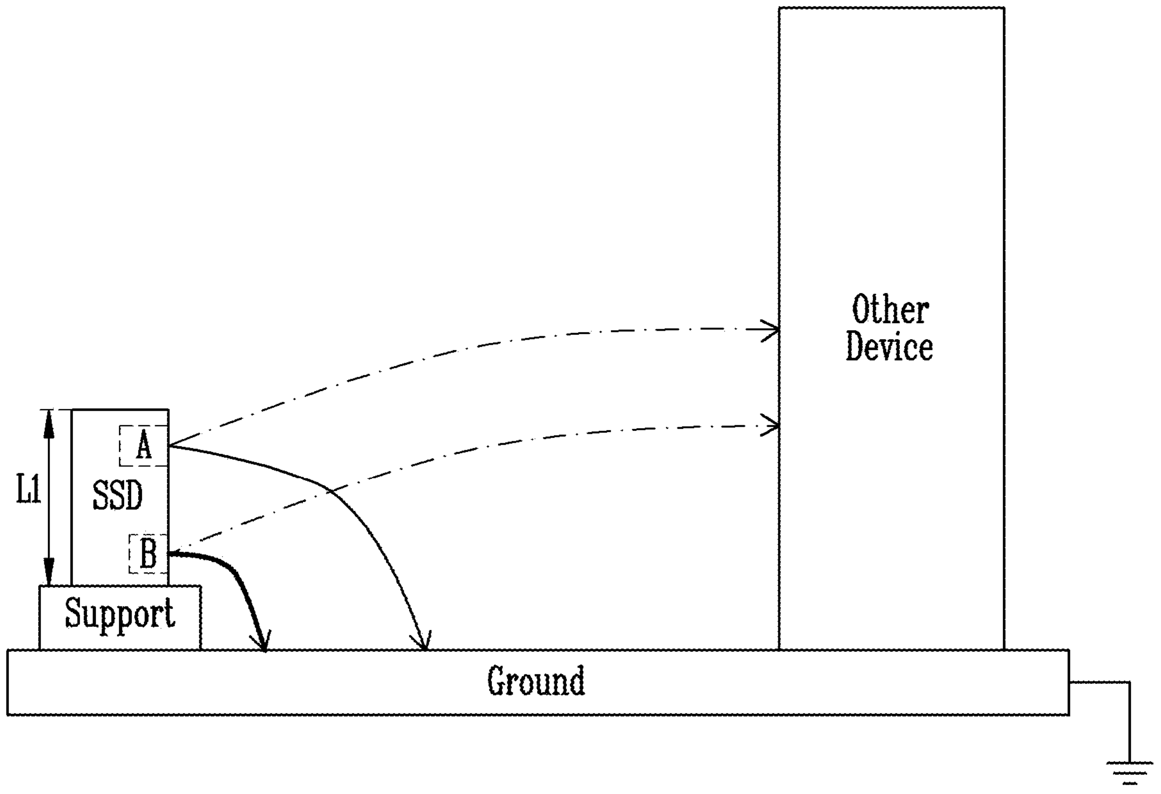
FIGS. 12A and 12B are diagrams illustrating an effect of EMI on a peripheral device when the sensor device SSD is placed horizontally and vertically, respectively.
Figure 12B:
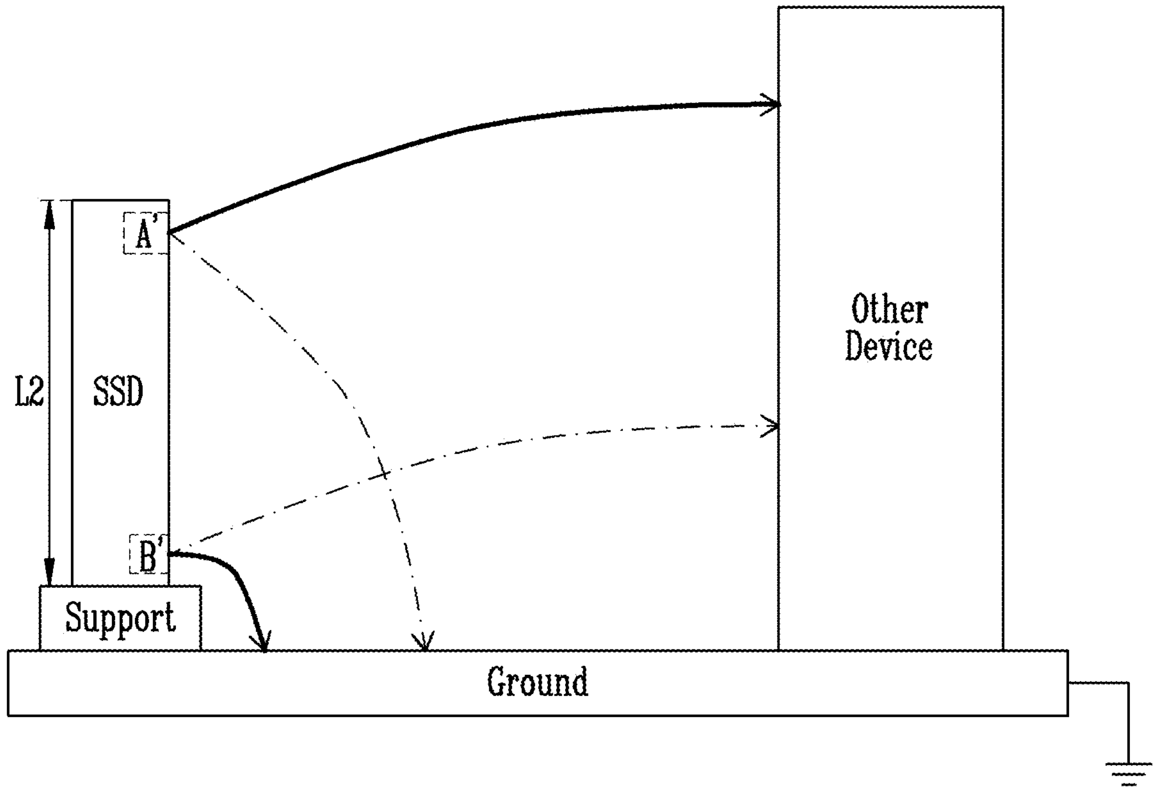

FIGS. 12A and 12B are diagrams illustrating an effect of EMI on the peripheral device when the sensor device SSD is placed horizontally and vertically, respectively.

Referring to FIG. 12A, the effect of the EMI on the peripheral device when the sensor device SSD is placed horizontally is shown. In FIG. 12A, the sensor device is fixed by a support on the ground and is placed horizontally. Therefore, a difference between the highest position and the lowest position of the sensor device SSD corresponds to the relatively short length L1 of the short axis L1. In FIG. 12A, the effect of the EMI generated at a relatively high position A and a relatively low position B affecting on another device when the sensor device SSD is placed horizontally is shown by an arrow.

In a state in which the sensor device SSD is placed horizontally, some of the EMI generated at the positions A and B is absorbed into the ground, and some affects another device. In FIG. 12A, the effect of the EMI generated at the position A affecting another device is shown by a dotted line arrow, and the effect of the EMI absorbed into the ground is shown by a solid line arrow. In addition, from among the EMI generated at the position B, the effect on the other device is shown by a dotted line arrow, and the effect absorbed into the ground is shown by a solid line arrow. From among the indications of the EMI shown in FIG. 12A, the solid line arrow indicates an effect relatively greater than that of the dotted line arrow.

In FIG. 12A, because the sensor device SSD is placed horizontally, even though the EMI is the EMI generated at the relatively high position A, the effect on a peripheral another device is not large (dotted line arrow), and most of the EMI is absorbed into the ground surface (solid line arrow). In addition, most of the EMI generated at the relatively low position B is absorbed into the ground surface and an effect on the peripheral another device is small (dotted line arrow).

Referring to FIG. 12B, the effect of the EMI on the peripheral device when the sensor device SSD is placed vertically is shown. In FIG. 12B, the difference between the highest position and the lowest position of the sensor device SSD corresponds to the relatively long length of the long axis L2. In FIG. 12B, in a state in which the sensor device SSD is placed vertically, the effect of the EMI generated at the relatively high position A' and the relatively low position B' on another device is shown by an arrow.

In a state in which the sensor device SSD is placed vertically, some of the EMI generated at the positions A' and B' is absorbed into the ground, and some affects another device. In FIG. 12B, the effect of the EMI generated at the position A' affecting another device is shown by a solid line arrow, and the effect of the EMI absorbed into the ground is shown by a dotted line arrow. In addition, from among the EMI generated at the position B', the effect on the other device is shown by a dotted line arrow, and the effect absorbed into the ground is shown by a solid line arrow. From among the indications of the EMI shown in FIG. 12B, the solid line arrow indicates an effect relatively greater than that of the dotted line arrow.

In FIG. 12B, because the sensor device SSD is placed vertically, the effect of the EMI generated at the relatively high position A' on a peripheral area of another device may be large (solid line arrow), and only a portion of the EMI is absorbed into the ground surface (dotted line arrow). On the other hand, most of the EMI generated at the relatively low position B' is absorbed into the ground surface and an effect on the peripheral area of another device is small (dotted line arrow).

Referring to FIGS. 12A and 12B, it may be seen that the effect of the EMI on the peripheral device of a case where the sensor device SSD is placed horizontally and the effect of the EMI on the peripheral device of a case where the sensor device SSD is placed vertically are different. In addition, it may be seen that when the sensor device SSD is placed vertically, the EMI generated at an upper end position A' may significantly affect the peripheral device. This means that a method of generating the offset signal for reducing or minimizing the EMI caused by the driving signal is required to be different in a case where the sensor device SSD is placed horizontally and a case where the sensor device SSD is placed vertically.

In accordance with the sensor device and the method of operating the same according to one or more embodiments of the present disclosure, a mode of the sensor device is determined according to whether the sensor device is placed horizontally or not, and a generation operation method of the offset signal is performed differently according to the determined mode. Hereinafter, with reference to FIGS. 13 and 14, a method of operating a sensor device according to one or more embodiments of the present disclosure is described.

Figure 13:
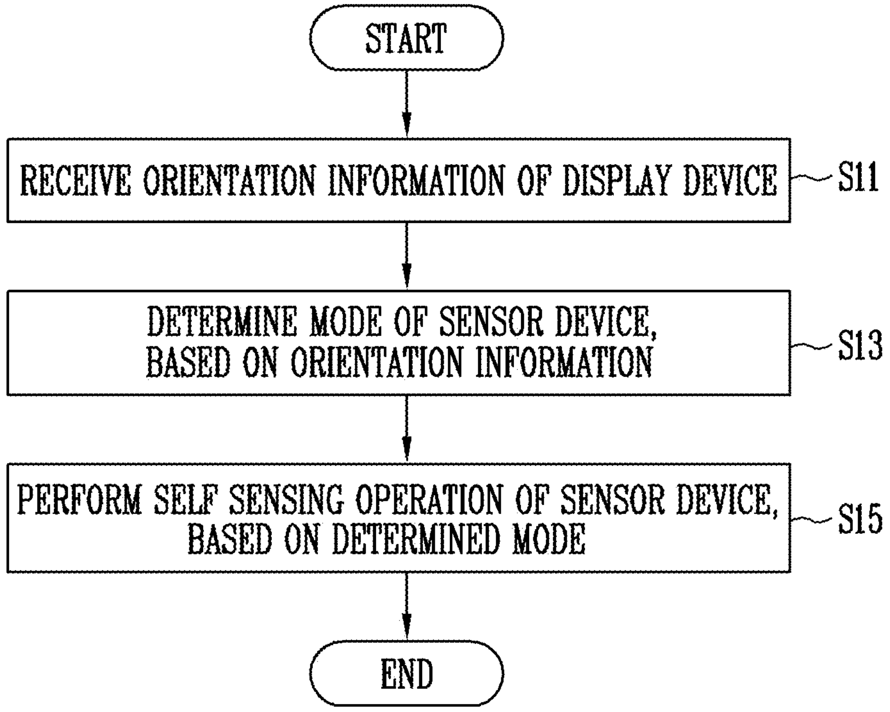
FIG. 13 is a flowchart illustrating a method of operating a sensor device according to one or more embodiments of the present disclosure.

FIG. 13 is a flowchart illustrating a method of operating a sensor device according to one or more embodiments of the present disclosure. Referring to FIG. 13, a method of operating a sensor device according to one or more embodiments of the present disclosure includes receiving orientation information of the sensor device (S11), determining a mode of the sensor device based on the orientation information (S13), and performing the self-sensing operation of the sensor device based on the determined mode.

In S11, the sensor device receives the orientation information. In one or more embodiments, the orientation information may be information indicating whether the display device 1 including the sensor device SSD is placed horizontally or vertically. When the display device 1 is placed horizontally, the sensor device SSD may also be placed horizontally, and when the display device 1 is placed vertically, the sensor device SSD may also be placed vertically. In one or more embodiments, the orientation information may be received from outside the sensor device SSD, and may be received from an application processor or a gyro sensor outside the display device 1. As another example, the display device 1 may be equipped with the gyro sensor, and in this case, the sensor device SSD may receive the orientation information from the gyro sensor in the display device 1.

In S13, the sensor device may determine the mode of the sensor device based on the received orientation information. In one or more embodiments, when the orientation information indicates that the display device is placed horizontally, the sensor device may determine to operate in a first mode. In addition, when the orientation information indicates that the display device is placed vertically, the sensor device may determine to operate in a second mode different from the first mode.

In S15, the sensor device performs the self-sensing operation of the sensor device based on the determined mode. When the determined mode is the second mode, an operation of generating the offset signal for reducing or minimizing the EMI caused by the driving signal generated at an upper end of the vertically placed sensor device during a self-sensing process may be performed.

In the present disclosure, the "upper end" of the sensor device may mean a portion that is relatively distant from the ground surface compared to a "lower end" of the sensor device.

Figure 14:
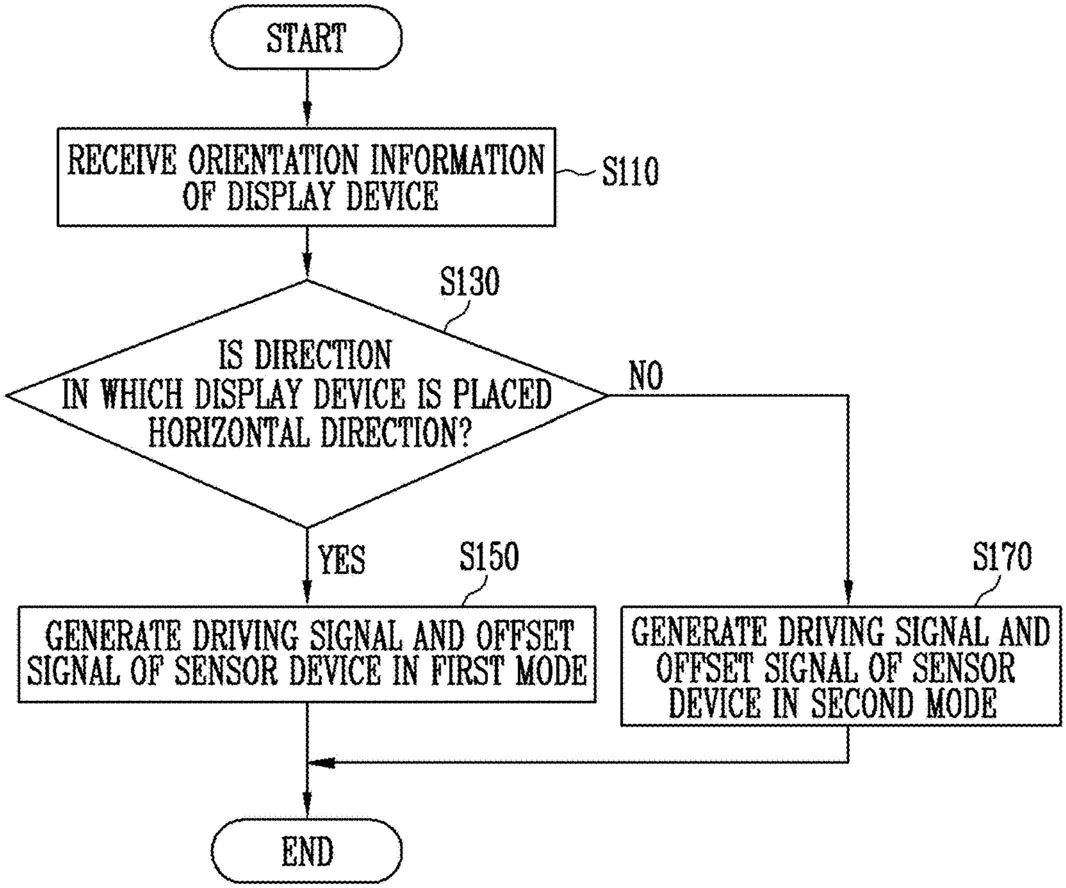
FIG. 14 is a flowchart illustrating a method of operating a sensor device according to one or more embodiments of the present disclosure.

FIG. 14 is a flowchart illustrating a method of operating a sensor device according to one or more embodiments of the present disclosure. FIG. 14 is a flowchart illustrating the method according to FIG. 13 in more detail.

Referring to FIG. 14, a method of operating a sensor device according to one or more embodiments of the present disclosure includes receiving the orientation information of the display device (S110) and determining whether a direction in which the display device is placed is horizontal (S130). In addition, the method of operating the sensor device may include at least one of generating the driving signal and the offset signal of the sensor device in the first mode (S150) when the direction in which the display device is placed is the horizontal direction (S130: Yes) or generating the driving signal and the offset signal of the sensor device in the second mode (S170) when the direction in which the display device is placed is the vertical direction (S130: No).

In one or more embodiments, S150 of FIG. 14 may be performed in the first mode, that is, in the same method as described with reference to FIGS. 10A and 10B. In this case, the number of first sensors TX1 to TXh corresponding to the area Area1 and the number of first sensors TX(h+1) to TXq corresponding to the area Area2 may be substantially the same. In addition, the number of second sensors RX1 to RXk corresponding to the area Area3 and the number of second sensors RX(k+1) to RXp corresponding to the area Area4 may be substantially the same. As another example, the number of second sensors RX(k+1) to RXp corresponding to the area Area4 may be greater than the number of second sensors RX1 to RXk corresponding to the area Area3.

In one or more embodiments, when the display device SSD is placed vertically, S170 of FIG. 14 for reducing the effect of the EMI generated at the upper end, that is, the self-sensing operation performed in the second mode, may be performed in various methods. Hereinafter, with reference to FIGS. 15A-21B, a method of generating the offset signal according to a direction in which the sensor device is placed is described in detail.

Figure 15A:
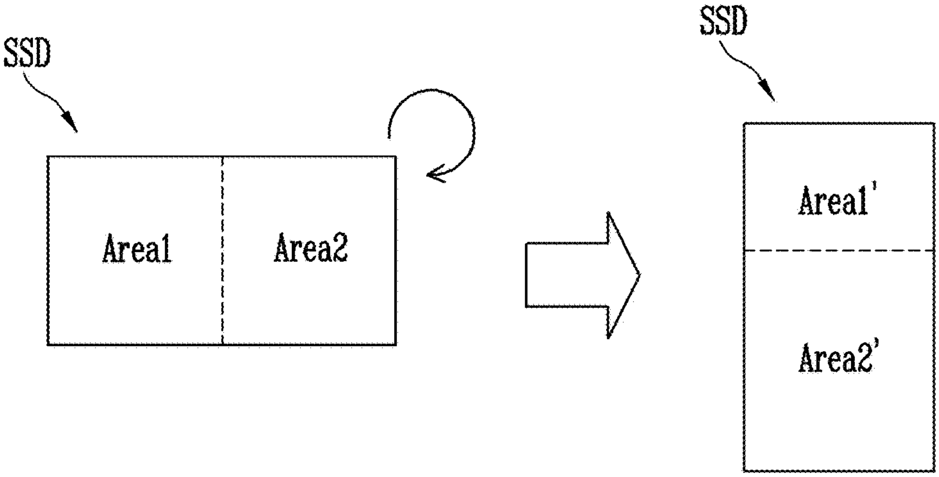
FIGS. 15A and 15B are diagrams illustrating a change of an area for a self-sensing operation according to one or more embodiments of the present disclosure when the sensor device is rotated clockwise in a state in which the sensor device is placed horizontally, and thus the sensor device is placed in a vertical direction.
Figure 15B:
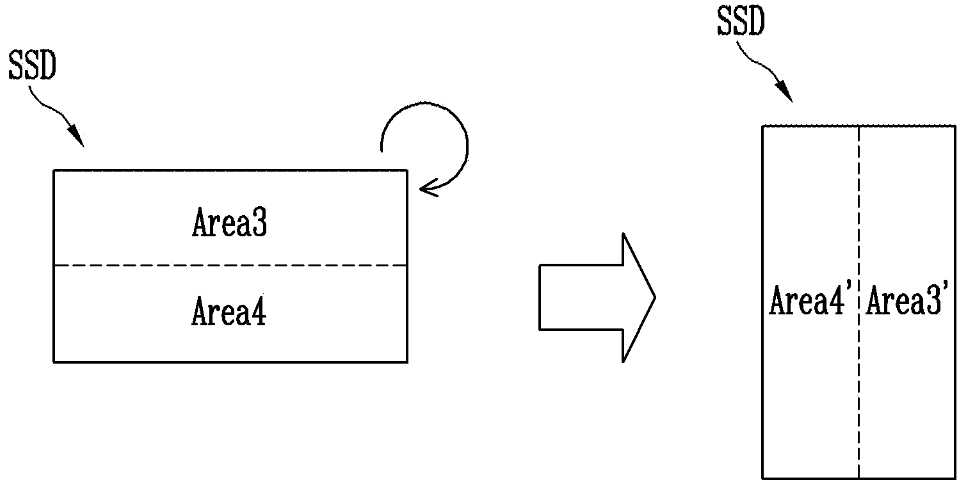

FIGS. 15A and 15B are diagrams illustrating a change of an area for a self-sensing operation according to one or more embodiments of the present disclosure when the sensor device is rotated clockwise in a state in which the sensor device is placed horizontally, and thus the sensor device is placed in the vertical direction. Hereinafter, the present disclosure is described under an assumption that when the display device 1 is placed horizontally, the sensor device SSD is also placed horizontally, and when the display device 1 is placed vertically, the sensor device SSD is also placed vertically.

Referring to FIG. 15A, when the sensor device is placed horizontally, the sensor device may be divided into the two areas Area1 and Area2 of the horizontal direction, as described with reference to FIG. 10A. As an example, the areas of the respective two areas Area1 and Area2 may be substantially the same.

In one or more embodiments, when the horizontally placed sensor device is rotated clockwise and thus the sensor device is placed vertically, the sensor device may be divided into two areas Area1' and Area2' of the vertical direction. According to one or more embodiments of the present disclosure, the areas of the two areas Area1' and Area2' may be different from each other. For example, the area of the lower end area Area2' may be greater than the area of the upper end area Area1'. During the self-sensing section, when a driving signal of sensors corresponding to the upper end area Area1' is generated, because the number of sensors that generate the offset signal is great in the relatively wider lower end area Area2', an effect of EMI generated in the upper end area Area1' may be reduced or minimized.

Referring to FIG. 15B, when the sensor device is placed horizontally, the sensor device may be divided into the two areas Area3 and Area4 of the vertical direction, as described with reference to FIG. 10B. As an example, the areas of the two respective areas Area3 and Area4 may be substantially the same. This is because in a case where the sensor device SSD is placed horizontally, when the driving signal is generated at a relatively upper position, the effect of the EMI on other peripheral devices is small. According to one or more embodiments, the area of the upper end area Area3 may be somewhat greater than that of the lower end area Area4. A difference between the area of the upper end area Area3 and the area of the lower end area Area4 may be designed to be small.

In one or more embodiments, when the horizontally placed sensor device is rotated clockwise and thus the sensor device is placed vertically, the sensor device may be divided into two areas Area4' and Area3' of the vertical direction. According to one or more embodiments, the areas of the two areas Area4' and Area3' may be the same.

Figure 16A:
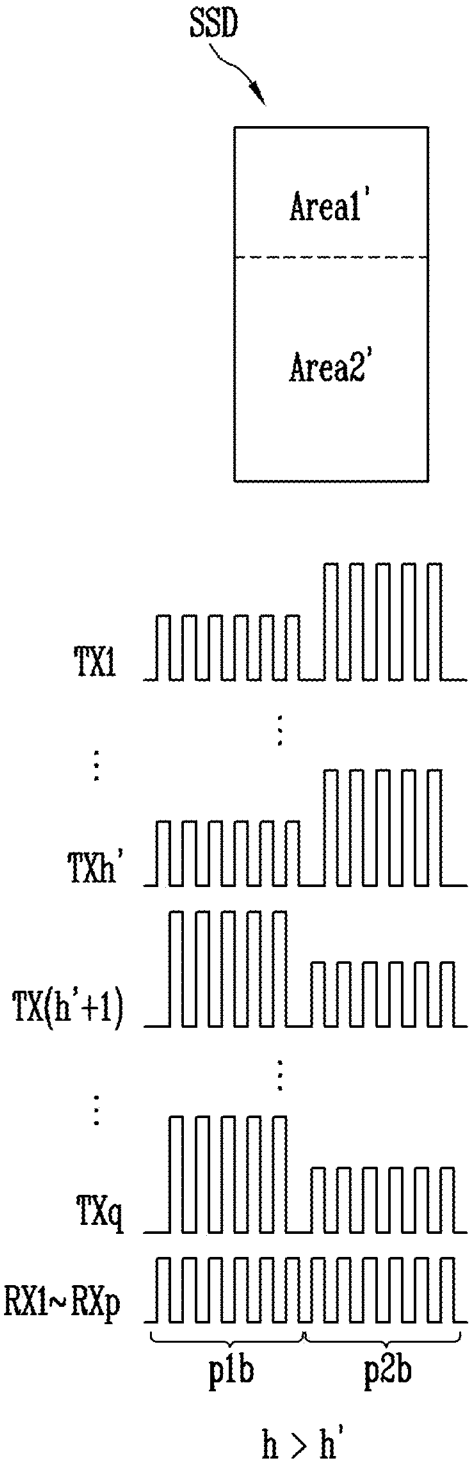
FIG. 16A is a diagram illustrating an example of the self-sensing operation of the sensor device in the self-sensing section when the sensor device is placed vertically.

FIG. 16A is a diagram illustrating an example of the self-sensing operation of the sensor device in the self-sensing section when the sensor device is placed vertically. More specifically, the self-sensing operation performed in the periods p1*b* and p2*b* from among the periods p1*b*, p2*b*, p3*b*, and p4*b* shown in FIG. 9 is shown in FIG. 16A.

Referring to FIG. 16A, a self-sensing operation for the two areas Area1' and Area2' may be sequentially performed in the periods p1*b* and p2*b*.

In the period p1*b*, the self-sensing operation for the area Area1' may be performed. To this end, the sensor driver 220 may transmit the driving signals to the first sensors TX1 to TXh' corresponding to the area Area1' from among the first sensors TX1 to TXq. In one or more embodiments, an offset operation for the area Area2' may be performed in the period p1*b*. To this end, the sensor driver 220 may transmit the offset signals to the first sensors TX(h'+1) to TXq corresponding to the area Area2' from among the first sensors TX1 to TXq.

In addition, in order to effectively perform the offset operation for the area Area2', the sensor driver 220 may transmit the dummy signals to the second sensors RX1 to RXp in the period p1*b*.

Because the driving signal transmitted to the first sensors TX1 to TXh' and the dummy signal transmitted to the second sensors RX1 to RXp in the period p1*b* have the same phase and frequency, a magnitude of the first sensors TX(h'+1) to TXq may be greater than a magnitude of the driving signals or the dummy signals transmitted to the first sensors TX1 to TXh'.

Through this, the sensor device SSD may sense whether a touch is generated on the display device 1 in the area Area1' during the period p1*b*.

Thereafter, a self-sensing operation for the area Area2' may be performed in the period p2*b*. To this end, the sensor driver 220 may transmit the driving signals to the first sensors TX(h'+1) to TXq corresponding to the area Area2' from among the first sensors TX1 to TXq. In one or more embodiments, an offset operation for the area Area1' may be performed in the period p2*b*. To this end, the sensor driver 220 may transmit the offset signals to the first sensors TX1 to TXh' corresponding to the area Area1' from among the first sensors TX1 to TXq.

In addition, in order to effectively perform the offset operation for the area Area1', the sensor driver 220 may transmit the dummy signals to the second sensors RX1 to RXp in the period p2*b*.

Through this, the sensor device SSD may sense whether a touch is generated on the display device 1 in the area Area2' during the period p2*b*.

As described above with reference to FIG. 15A, the area of the lower end area Area2' may be greater than the area of the upper end area Area1'. In one or more embodiments, the area of the upper end area Area1' of a case where the sensor device SSD is placed vertically may be less than the area of the left area Area1 of a case where the sensor device SSD is placed horizontally. Accordingly, the number h of the first sensors TX1 to TXh corresponding to the area Area1 may be greater than the number h' of the first sensors TX1 to TXh' corresponding to the area Area1'.

In one or more embodiments, although not explicitly shown in FIG. 16A, the number h' of the first sensors TX1 to TXh' corresponding to the area Area1' may be less than q-h', which is the number of first sensors TX(h'+1) to TXq corresponding to the area Area2'. Accordingly, a relationship shown in Equation 1 below may be established.

$$h' < q/2 \qquad \text{Equation 1}$$

Figure 16B:
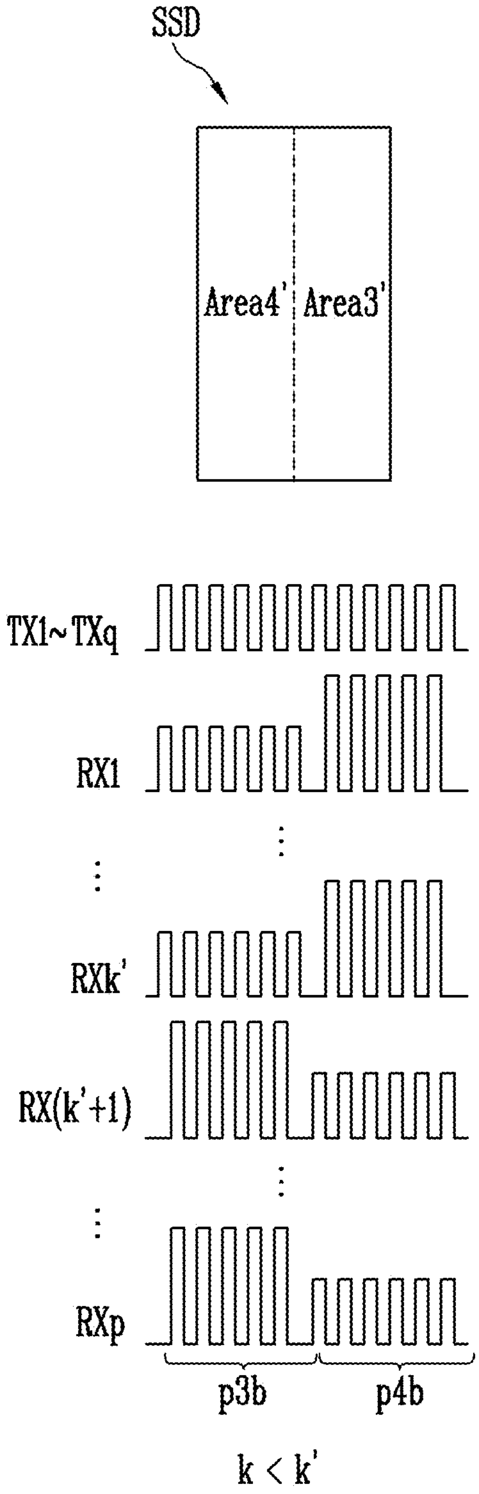
FIG. 16B is a diagram illustrating an example of the self-sensing operation of the sensor device in the self-sensing section when the sensor device is placed vertically.

FIG. 16B is a diagram illustrating an example of the self-sensing operation of the sensor device in the self-sensing section when the sensor device is placed vertically. More specifically, the self-sensing operation performed in the periods p3*b* and p4*b* from among the periods p1*b*, p2*b*, p3*b*, and p4*b* shown in FIG. 9 is shown in FIG. 16B.

Referring to FIG. 16B, a self-sensing operation for the two areas Area3' and Area4' may be sequentially performed in the periods p3*b* and p4*b*.

In the period p3*b*, the self-sensing operation for the area Area3' may be performed. To this end, the sensor driver 220 may transmit the driving signals to the second sensors RX1 to RXk' corresponding to the area Area3' from among the second sensors RX1 to RXp./in one or more embodiments, an offset operation for the area Area4' may be performed in the period p3*b*. To this end, the sensor driver 220 may transmit the offset signals to the second sensors RX(k'+1) to RXp corresponding to the area Area4' from among the second sensors RX1 to RXp.

In addition, in order to effectively perform the offset operation for the area Area4', the sensor driver 220 may transmit the dummy signals to the first sensors TX1 to TXq in the period p3*b*.

Through this, the sensor device SSD may sense whether a touch is generated on the display device 1 in the area Area3' during the period p3*b*.

Thereafter, a self-sensing operation on the area Area4' may be performed in the period p4*b*. To this end, the sensor driver 220 may transmit the driving signals to the second sensors RX(k'+1) to RXp corresponding to the area Area4' from among the second sensors RX1 to RXp. In one or more embodiments, an offset operation for the area Area3' may be performed in the period p4*b*. To this end, the sensor driver 220 may transmit the offset signals to the second sensors RX1 to RXk' corresponding to the area Area3' from among the second sensors RX1 to RXp.

In addition, in order to effectively perform the offset operation for the area Area3', the sensor driver 220 may transmit the dummy signals to the first sensors TX1 to TXq in the period p4*b*.

Through this, the sensor device SSD may sense whether a touch is generated on the display device 1 in the area Area4' during the period p4*b*.

As described above with reference to FIG. 15B, the area of the left area Area4' and the area of the right area Area3' may be substantially the same. In one or more embodiments, the area of the right area Area3' of a case where the sensor device SSD is placed vertically may be greater than the area of the upper end area Area3 of a case where the sensor device SSD is placed horizontally. Accordingly, the number k of the second sensors RX1 to RXk corresponding to the area Area3 may be less than the number k' of the second sensors RX1 to RXk' corresponding to the area Area3'.

Figure 17A:
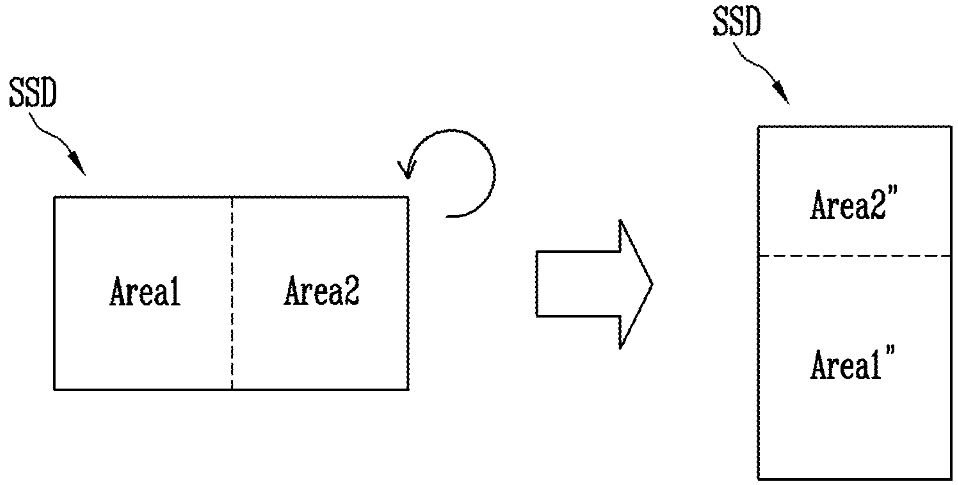
FIGS. 17A and 17B are diagrams illustrating a change of an area for the self-sensing operation when the sensor device is rotated counterclockwise in a state in which the sensor device is placed horizontally, and thus the sensor device is placed in a vertical direction.
Figure 17B:
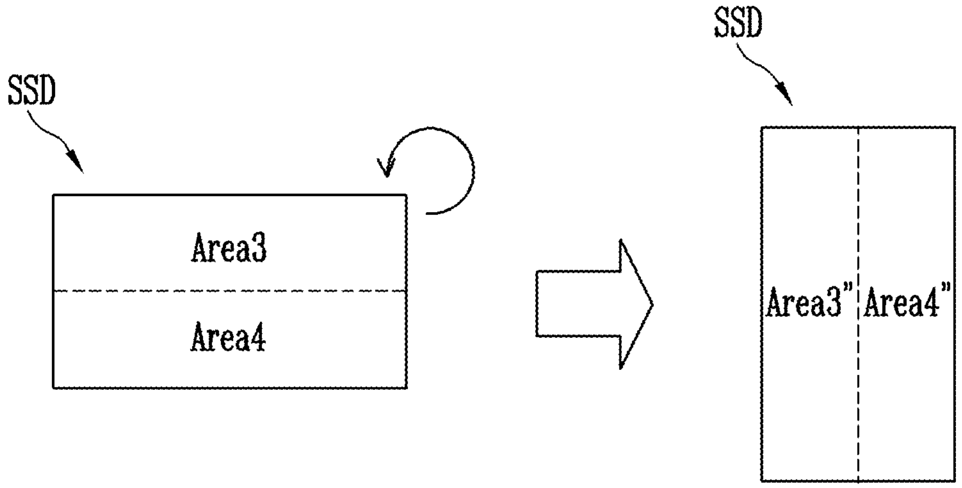

FIGS. 17A and 17B are diagrams illustrating a change of an area for the self-sensing operation when the sensor device is rotated counterclockwise in a state in which the sensor device is placed horizontally, and thus the sensor device is placed in a vertical direction.

Referring to FIG. 17A, when the sensor device is placed horizontally, the sensor device may be divided into the two areas Area1 and Area2 of the horizontal direction, as described with reference to FIG. 10A. As an example, the areas of the two respective areas Area1 and Area2 may be substantially the same.

In one or more embodiments, when the horizontally placed sensor device is rotated counterclockwise and placed vertically, the sensor device may be divided into two areas Area1" and Area2" of the vertical direction. According to one or more embodiments of the present disclosure, the areas of the two areas Area1" and Area2" may be different from each other. For example, the area of the lower end area Area1" may be greater than the area of the upper end area Area2". During the self-sensing section, when a driving signal of sensors corresponding to the upper end area Area2" is generated, because the number of sensors that generate the offset signal in the relatively wider lower end area Area1" is great, an effect of EMI generated in the upper end area Area2" may be reduced or minimized.

Referring to FIG. 17B, when the sensor device is placed horizontally, the sensor device may be divided into the two areas Area3 and Area4 of the vertical direction, as described with reference to FIG. 10B. As an example, the areas of the two respective areas Area3 and Area4 may be substantially the same. This is because in a case where the sensor device SSD is placed horizontally, when the driving signal is generated at a relatively upper position, the effect of the EMI on other peripheral devices is small. According to one or more embodiments, the area of the upper end area Area3 may be somewhat greater than that of the lower end area Area4. A difference between the areas of the upper end area Area3 and the lower end area Area4 may be designed to be small.

In one or more embodiments, when the horizontally placed sensor device is rotated counterclockwise and placed vertically, the sensor device may be divided into two vertical areas Area3" and Area4". According to one or more embodiments, the areas of the two areas Area3" and Area4" may be the same.

Figure 18A:
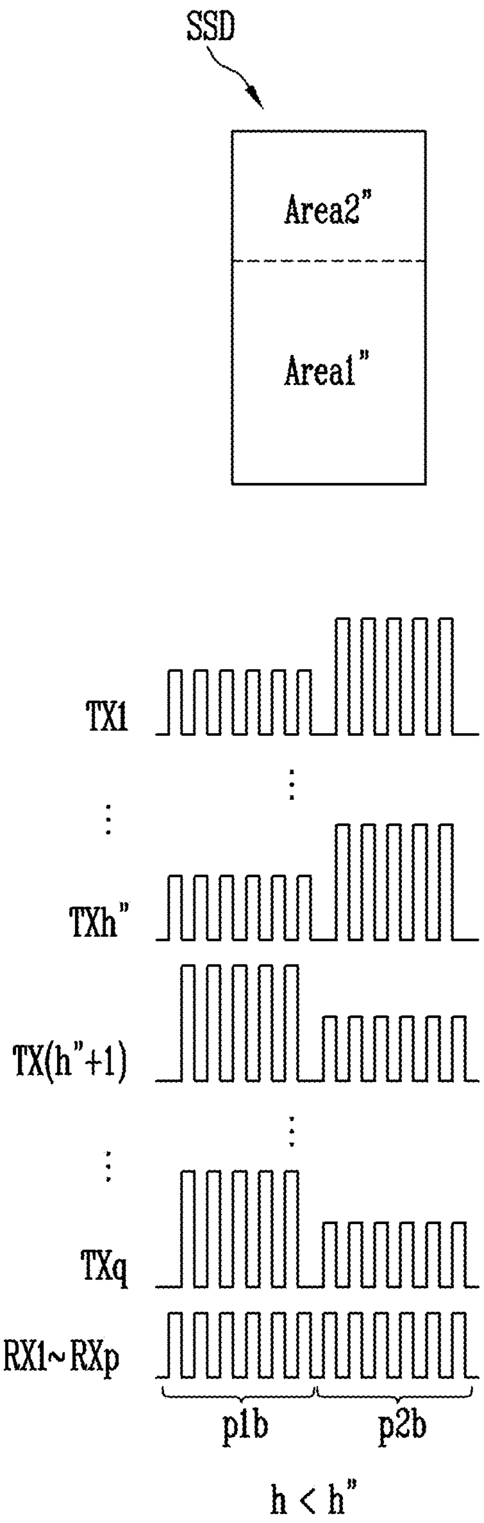
FIG. 18A is a diagram illustrating another example of the self-sensing operation of the sensor device in the self-sensing section when the sensor device is placed vertically.

FIG. 18A is a diagram illustrating another example of the self-sensing operation of the sensor device in the self-sensing section when the sensor device is placed vertically. More specifically, the self-sensing operation performed in the periods p1*b* and p2*b* from among the periods p1*b*, p2*b*, p3*b*, and p4*b* shown in FIG. 9 is shown in FIG. 18A.

Referring to FIG. 18A, the self-sensing operation for the two areas Area1" and Area2" may be sequentially performed in the periods p1*b* and p2*b*.

The self-sensing operation for the area Area1" may be performed in the period p1*b*. To this end, the sensor driver 220 may transmit the driving signals to first sensors TX1 to TXh" corresponding to the area Area1" from among the first sensors TX1 to TXq. In one or more embodiments, an offset operation for the area Area2" may be performed in the period p1*b*. To this end, the sensor driver 220 may transmit the offset signals to the first sensors TX(h"+1) to TXq corresponding to the area Area2" from among the first sensors TX1 to TXq.

In addition, in order to effectively perform the offset operation for the area Area2", the sensor driver 220 may transmit the dummy signals to the second sensors RX1 to RXp in the period p1*b*. Through this, the sensor device SSD may sense whether a touch is generated on the display device 1 in the area Area1" during the period p1*b*.

Thereafter, the self-sensing operation for the area Area2" may be performed in the period p2*b*. To this end, the sensor driver 220 may transmit the driving signals to the first sensors TX(h"+1) to TXq corresponding to the area Area2" from among the first sensors TX1 to TXq. In one or more embodiments, an offset operation for the area Area1" may be performed in the period p2*b*. To this end, the sensor driver 220 may transmit the offset signals to the first sensors TX1 to TXh" corresponding to the area Area1" from among the first sensors TX1 to TXq.

In addition, in order to effectively perform the offset operation for the area Area1", the sensor driver 220 may transmit the dummy signals to the second sensors RX1 to RXp in the period p2*b*.

Through this, the sensor device SSD may sense whether a touch is generated on the display device 1 in the area "Area2" during the period p2*b*.

As described above with reference to FIG. 17A, the area of the lower end area Area1" may be greater than the area of the upper end area Area2". In one or more embodiments, the area of the lower end area Area1" of a case where the sensor device SSD is placed vertically may be greater than the area of the left area Area1 of a case where the sensor device SSD is placed horizontally. Accordingly, the number h of the first sensors TX1 to TXh corresponding to the area Area1 may be less than the number h" of the first sensors TX1 to TXh"

corresponding to the area Area1". Accordingly, even though the sensor device SSD is placed in the vertical direction, an effect of EMI generated from a sensor positioned in an upper end area may be reduced or minimized.

Figure 18B:
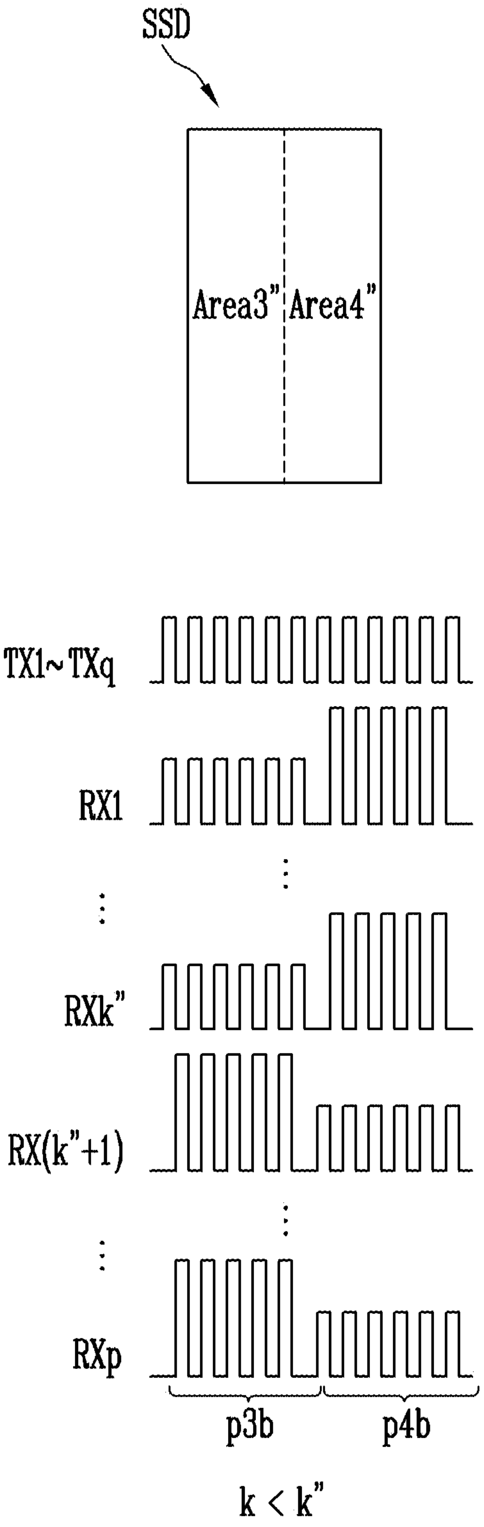
FIG. 18B is a diagram illustrating another example of the self-sensing operation of the sensor device in the self-sensing section when the sensor device is placed vertically.

FIG. 18B is a diagram illustrating another example of the self-sensing operation of the sensor device in the self-sensing section when the sensor device is placed vertically. More specifically, the self-sensing operation performed in the periods p3b and p4b from among the periods p1b, p2b, p3b, and p4b shown in FIG. 9 is shown in FIG. 18B.

Referring to FIG. 18B, the self-sensing operation for the two areas Area3" and Area4" may be sequentially performed in the periods p3b and p4b.

The self-sensing operation for the area Area3" may be performed in the period p3b. To this end, the sensor driver 220 may transmit the driving signals to second sensors RX1 to RXk" corresponding to the area Area3" from among the second sensors RX1 to RXp. In one or more embodiments, an offset operation for the area Area4" may be performed in the period p3b. To this end, the sensor driver 220 may transmit the offset signals to the second sensors RX(k"+1) to RXp corresponding to the area Area4" from among the second sensors RX1 to RXp.

In addition, in order to effectively perform the offset operation for the area Area4", the sensor driver 220 may transmit the dummy signals to the first sensors TX1 to TXq in the period p3b. Through this, the sensor device SSD may sense whether a touch is generated on the display device 1 in the area Area3" during the period p3b.

Thereafter, the self-sensing operation for the area Area4" may be performed in the period p4b. To this end, the sensor driver 220 may transmit the driving signals to the second sensors RX(k"+1) to RXp corresponding to the area Area4" from among the second sensors RX1 to RXp. In one or more embodiments, an offset operation for the area Area3" may be performed in the period p4b. To this end, the sensor driver 220 may transmit the offset signals to the second sensors RX1 to RXK" corresponding to the area Area3" from among the second sensors RX1 to RXp.

In addition, in order to effectively perform the offset operation for the area Area3", the sensor driver 220 may transmit the dummy signals to the first sensors TX1 to TXq in the period p4b.

Through this, the sensor device SSD may sense whether a touch is generated on the display device 1 in the area "Area4" during the period p4b.

As described above with reference to FIG. 15B, the area of the left area Area4" and the area of the right area Area3" may be substantially the same. In one or more embodiments, the area of the left area Area3" of a case where the sensor device SSD is placed vertically may be greater than the area of the upper end area Area3 of a case the sensor device SSD is placed horizontally. Accordingly, the number k of the second sensors RX1 to RXk corresponding to the area Area3 may be less than the number k of the second sensors RX1 to RXk' corresponding to the area Area3". Accordingly, even though the sensor device SSD is placed in the vertical direction, an effect of EMI generated from a sensor positioned in the upper end area may be reduced or minimized.

As described with reference to FIGS. 15A-18B, even though the sensor device SSD is placed in the vertical direction, a method of the self-sensing operation may be performed differently according to whether the sensor device SSD is rotated clockwise in a state in which the sensor device is originally placed horizontally and thus is placed vertically, or the sensor device SSD is rotated counterclockwise and thus the is placed vertically. Hereinafter, the present disclosure is described with respect to one or more embodiments where the sensor device SSD is rotated clockwise and thus is placed vertically.

Figure 19A:
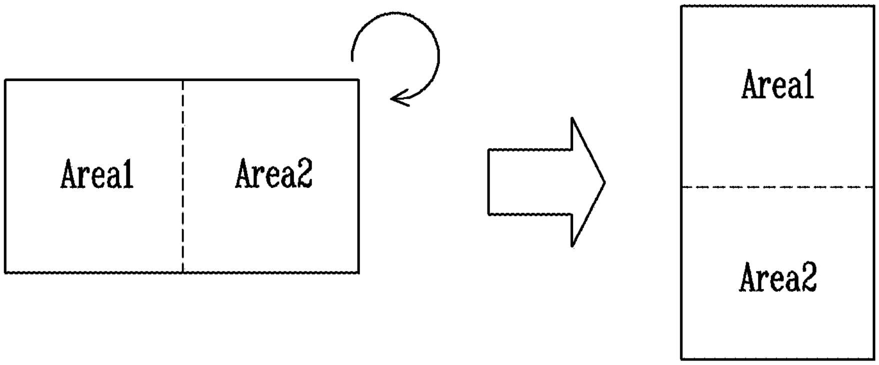
FIGS. 19A and 19B are diagrams illustrating a change in an area for a self-sensing operation according to one or more embodiments of the present disclosure when the sensor device is rotated clockwise in a state in which the sensor device is placed horizontally, and thus the sensor device is placed in a vertical direction.
Figure 19B:
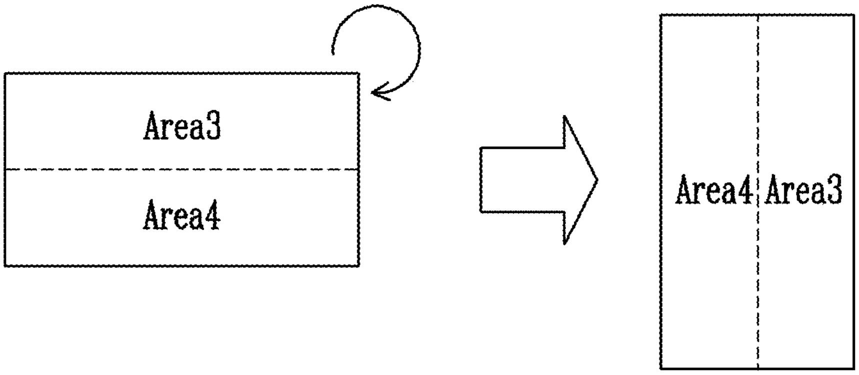

FIGS. 19A and 19B are diagrams illustrating a change of an area for the self-sensing operation according to one or more embodiments of the present disclosure when the sensor device is rotated clockwise in a state in which the sensor device is placed horizontally and thus is placed in the vertical direction.

Referring to FIG. 19A, when the sensor device is placed horizontally, the sensor device may be divided into the two areas Area1 and Area2 of the horizontal direction, as described with reference to FIG. 10A. As an example, the areas of the two respective areas Area1 and Area2 may be substantially the same.

According to the embodiment shown in FIG. 19A, when the horizontally placed sensor device is rotated clockwise and thus is placed vertically, the sensor device may be divided into the two vertical areas Area1 and Area2.

Referring to FIG. 19B, when the sensor device is placed horizontally, the sensor device may be divided into the two areas Area3 and Area4 of the vertical direction, as described with reference to FIG. 10B. As an example, the areas of the two respective areas Area3 and Area4 may be substantially the same. This is because in a case where the sensor device SSD is placed horizontally, when the driving signal is generated at a relatively upper position, the effect of the EMI on other peripheral devices is small. In addition, when the horizontally placed sensor device is rotated clockwise and thus is placed vertically, the sensor device may be divided into the two vertical areas Area4 and Area3.

According to one or more embodiments shown in FIGS. 19A and 19B, a size of the area for the self-sensing operation may not change even though the sensor device SSD is rotated. In this case, by changing a magnitude of the offset signal or a length of the period p1b, p2b, p3b, and p4b for performing the self-sensing operation, the effect of the EMI generated from the sensor positioned in the upper end area may be reduced or minimized even though the sensor device SSD is placed in the vertical direction.

Figure 20A:
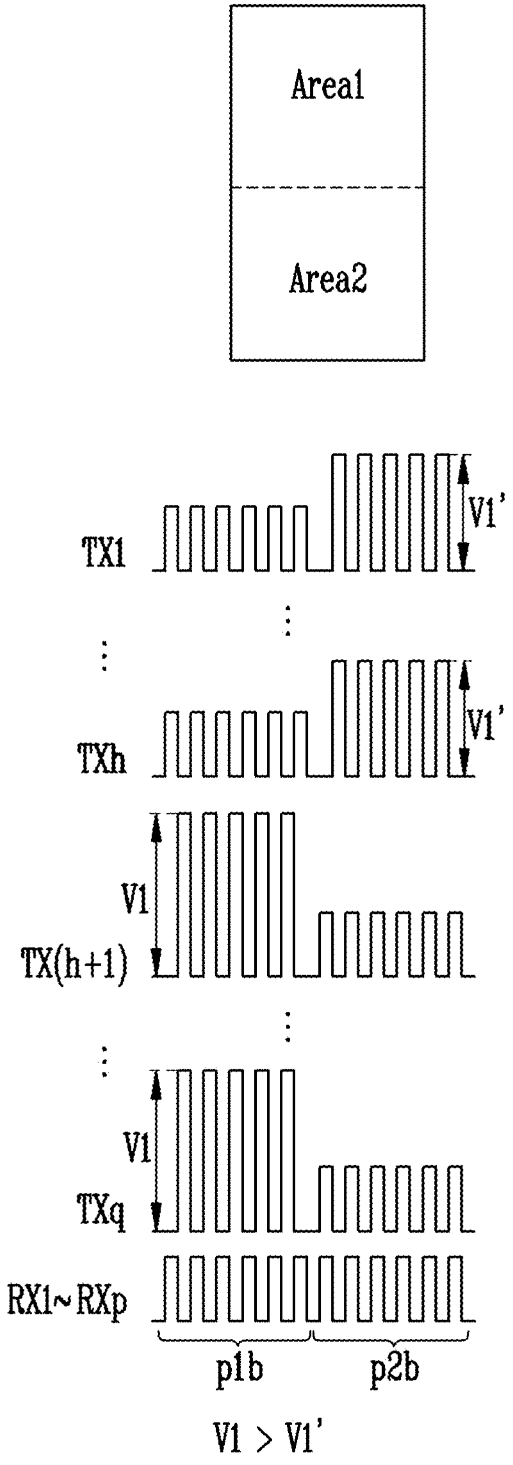
FIG. 20A is a diagram illustrating still another example of the self-sensing operation of the sensor device in the self-sensing section when the sensor device is placed vertically.

FIG. 20A is a diagram illustrating still another example of the self-sensing operation of the sensor device in the self-sensing section when the sensor device is placed vertically. More specifically, the self-sensing operation performed in the periods p1b and p2b from among the periods p1b, p2b, p3b, and p4b shown in FIG. 9 is shown in FIG. 20A.

Referring to FIG. 20A, the self-sensing operation performed in the periods p1b and p2b may be performed in substantially the same method as described with reference to FIG. 16A. However, in the embodiment shown in FIG. 16A, the number h of first sensors TX1 to TXh corresponding to the left area Area1 of a case where the sensor device SSD is placed horizontally is shown to be greater than the number h' of first sensors TX1 to TXh' corresponding to the upper and area Area1' of a case where the sensor device SSD is placed vertically. However, according to the embodiment of FIG. 20A, the number of first sensors TX1 to TXh corresponding to the left area Area1 of a case where the sensor device SSD is placed horizontally and the number of first sensors TX1 to TXh corresponding to the upper end area Area1 of a case where the sensor device SSD is placed vertically may be the same.

In one or more embodiments, a magnitude V1 of the offset signals transmitted to the first sensors TX(h+1) to TXq corresponding to the area Area2 in the period p1b may be greater than a magnitude V1' of the offset signals transmitted to the first sensors TX1 to TXh corresponding to the area Area1 in the period p2*b*. Accordingly, even though the sensor device SSD is placed in the vertical direction, the effect of the EMI generated from the sensor positioned in the upper end area may be reduced or minimized.

in one or more embodiments, when the sensor device SSD is placed in the horizontal direction, the magnitude of the offset signals applied to the first sensors TX(h+1) to TXq in the period p1*b* and the magnitude of the offset signals applied to the first sensors TX(h+1) to TXq in the period p1*b* may be substantially equal to the magnitude V1' of the offset signals transmitted to the first sensors TX1 to TXh corresponding to the area Area1.

Figure 20B:
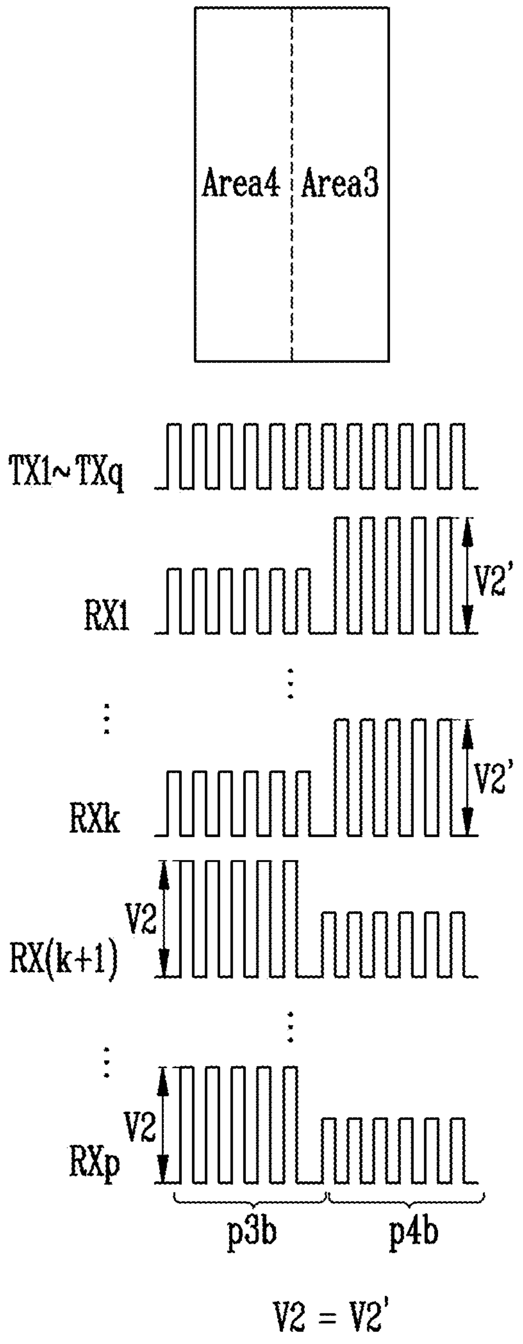
FIG. 20B is a diagram illustrating still another example of the self-sensing operation of the sensor device in the self-sensing section when the sensor device is placed vertically.

FIG. 20B is a diagram illustrating still another example of the self-sensing operation of the sensor device in the self-sensing section when the sensor device is placed vertically. More specifically, the self-sensing operation performed in the periods p3*b* and p4*b* from among the periods p1*b*, p2*b*, p3*b*, and p4*b* shown in FIG. 9 is shown in FIG. 20B.

Referring to FIG. 20B, the self-sensing operation performed in the periods p3*b* and p4*b* may be performed in substantially the same method as described with reference to FIG. 16B. However, in the embodiment shown in FIGS. 15B and 16B, the number k of second sensors RX1 to RXk corresponding to the upper end area Area3 of a case where the sensor device SSD is placed horizontally is shown to be less than the number k' of second sensors RX1 to RXk' corresponding to the right area Area3' of a case where the sensor device SSD is placed vertically. However, according to the embodiment of FIG. 20B, the number of second sensors RX1 to RXk corresponding to the upper end area Area3 of a case where the sensor device SSD is placed horizontally and the number of second sensors RX1 to RXk corresponding to the right area Area3 of a case where the sensor device SSD is placed vertically may be the same.

In one or more embodiments, a magnitude V2 of the offset signals transmitted to the second sensors RX(k+1) to RXp corresponding to the area Area4 in the period p3*b* may be substantially the same as a magnitude V2' of the offset signals transmitted to the second sensors RX1 to RXk corresponding to the area Area3 in the period p4*b* may be substantially the same.

Figure 21A:
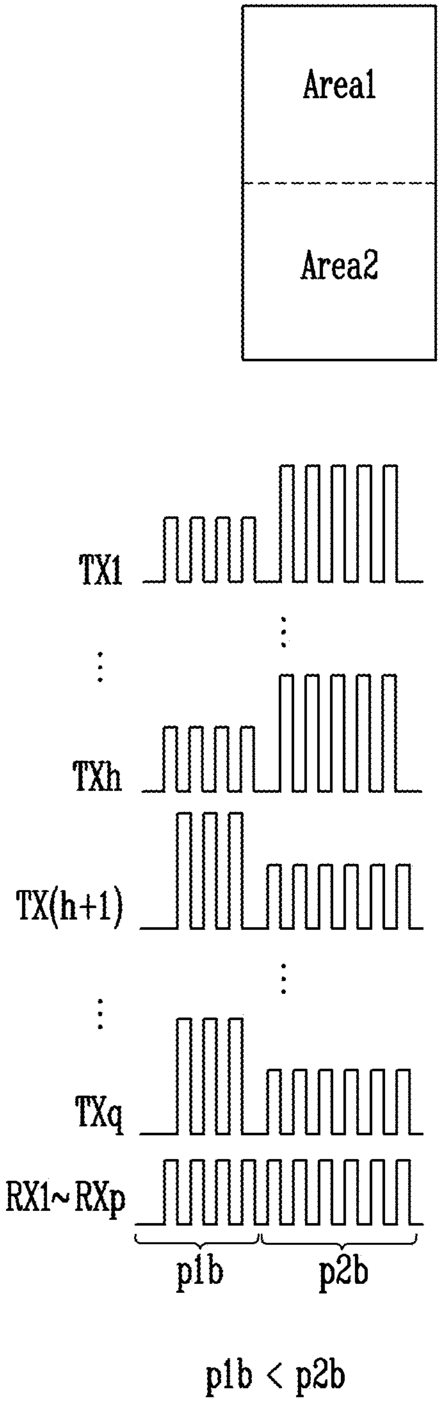
FIG. 21A is a diagram illustrating still another example of the self-sensing operation of the sensor device in the self-sensing section when the sensor device is placed vertically.

FIG. 21A is a diagram illustrating still another example of the self-sensing operation of the sensor device in the self-sensing section when the sensor device is placed vertically. More specifically, the self-sensing operation performed in the periods p1*b* and p2*b* from among the periods p1*b*, p2*b*, p3*b*, and p4*b* shown in FIG. 9 is shown in FIG. 21A.

Referring to FIG. 21A, the self-sensing operation performed in the periods p1*b* and p2*b* may be performed in substantially the same method as described with reference to FIG. 16A. However, in the embodiment shown in FIG. 16A, the number h of first sensors TX1 to TXh corresponding to the left area Area1 of a case where the sensor device SSD is placed horizontally is shown to be greater than the number h' of first sensors TX1 to TXh' corresponding to the upper end area Area1' of a case where the sensor device SSD is placed vertically. However, according to the embodiment of FIG. 21A, the number of first sensors TX1 to TXh corresponding to the left area Area1 of a case where the sensor device SSD is placed horizontally and the number of first sensors TX1 to TXh corresponding to the upper end area Area1 of a case where the sensor device SSD is placed vertically may be the same.

In the embodiment of FIG. 21A, a length of the period p1*b* in which the driving signal is generated at an upper end of the sensor device SSD during the self-sensing operation period may be shorter than a length of the period p2*b* in which the driving signal is generated at a lower end. Through this, even though the sensor device SSD is placed vertically, the effect of the EMI generated from the sensor positioned in the upper end area of the sensor device SSD may be reduced or minimized.

Figure 21B:
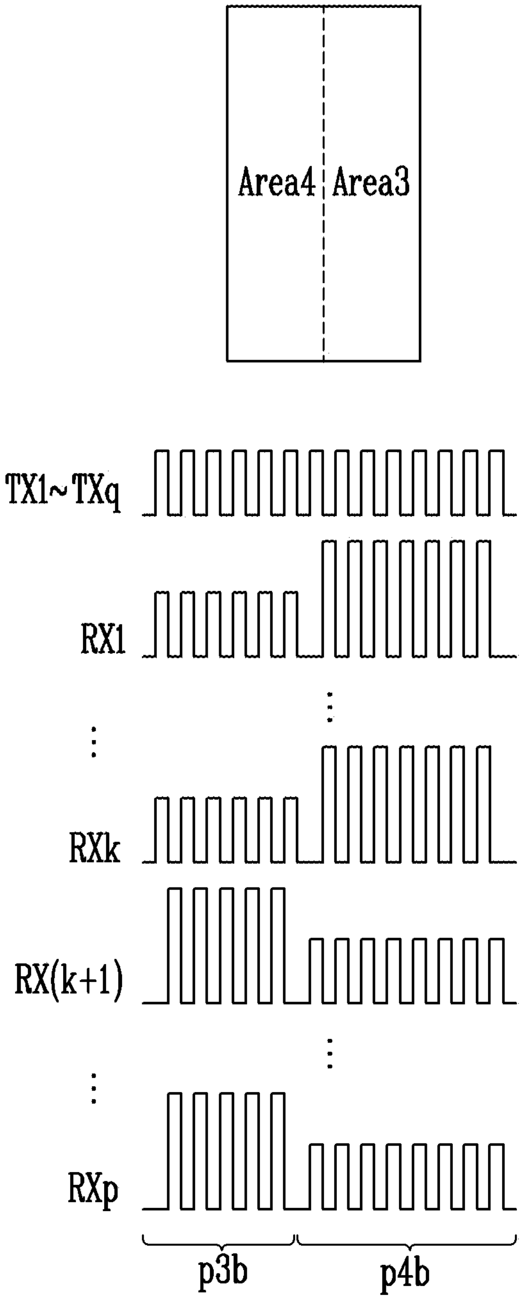
FIG. 21B is a diagram illustrating still another example of the self-sensing operation of the sensor device in the self-sensing section when the sensor device is placed vertically.

FIG. 21B is a diagram illustrating still another example of the self-sensing operation of the sensor device in the self-sensing section when the sensor device is placed vertically. More specifically, the self-sensing operation performed in the periods p3*b* and p4*b* is shown in FIG. 21B.

Referring to FIG. 21B, the self-sensing operation performed in the periods p3*b* and p4*b* may be performed in substantially the same method as described with reference to FIG. 16B. However, in the embodiment shown in FIG. 16B, the number k of second sensors RX1 to RXk corresponding to the upper end area Area3 of a case where the sensor device SSD is placed horizontally is shown to be less than the number k' of second sensors RX1 to RXk' corresponding to the right area Area3' of a case where the sensor device SSD is placed vertically. However, according to the embodiment of FIG. 21B, the number of second sensors RX1 to RXk corresponding to the upper end area Area3 of a case where the sensor device SSD is placed horizontally and the number of second sensors RX1 to RXk corresponding to the right area Area3 of a case where the sensor device SSD is placed vertically may be the same.

In the embodiment of FIG. 21B, a length of the period p4*b* for generating a left driving signal of the sensor device SSD during the self-sensing operation period may be substantially the same as a length of the period p3*b* for generating a right driving signal of the sensor device SSD.

The drawings referred to so far and the detailed description of the present disclosure described herein are merely examples of the present disclosure, are used for merely describing the present disclosure, and are not intended to limit the meaning and the scope of the present disclosure described in claims. Therefore, those skilled in the art will understand that various modifications and equivalent other embodiments are possible from these. Thus, the true scope of the present disclosure should be determined by the technical spirit of the appended claims and their equivalents.

What is claimed is:

1. A sensor device comprising:

first sensors arranged along a first direction;

second sensors arranged along a second direction different from the first direction; and a sensor driver configured to transmit driving signals to the first sensors through first sensor lines and to receive sensing signals from the second sensors through second sensor lines, wherein during a first period, the sensor driver is configured to transmit the driving signals to a first group of sensors from among the first sensors, and to transmit offset signals having a frequency that is equal to that of the driving signals and a phase that is different from that of the driving signals to a second group of sensors from among the first sensors, wherein during a second period, the sensor driver is configured to transmit the offset signals to the first group of sensors and to transmit the driving signals to the second group of sensors, and wherein the sensor driver is configured to generate the driving signals and the offset signals during the first and second periods based on orientation information of the sensor device.

2. The sensor device according to claim 1, wherein the orientation information comprises information on whether the sensor device is placed horizontally or vertically in reference to a ground surface.

3. The sensor device according to claim 1, wherein a number of the first sensors is greater than a number of the second sensors, when the first direction is closer to being parallel to a ground surface than the second direction, the orientation information comprises information that the sensor device is placed horizontally, and when the second direction is closer to being parallel to the ground surface than the first direction, the orientation information comprises information that the sensor device is placed vertically.

4. The sensor device according to claim 3, wherein when the information that the sensor device is placed horizontally is included in the orientation information, during the first period, the sensor driver is configured to transmit the driving signals to h sensors from among the first sensors and to transmit the offset signals to q-h sensors from among the first sensors, and during the second period, the sensor driver is configured to transmit the offset signals to the h sensors and to transmit the driving signals to the q-h sensors, wherein h is a natural number greater than 1, and q is a natural number greater than h.

5. The sensor device according to claim 4, wherein when the information that the sensor device is placed vertically is included in the orientation information, during the first period, the sensor driver is configured to transmit the driving signals to h' sensors, which are less than the h sensors, from among the first sensors, and to transmit the offset signals to q-h' sensors from among the first sensors, and during the second period, the sensor driver is configured to transmit the offset signals to the h' sensors and to transmit the driving signals to the q-h' sensors, wherein h' is a natural number less than h.

6. The sensor device according to claim 4, wherein when the information that the sensor device is placed vertically is included in the orientation information, during the first period, the sensor driver is configured to transmit the driving signals to h" sensors, which are greater than the h sensors, from among the first sensors and to transmit the offset signals to q-h" sensors from among the first sensors, and during the second period, the sensor driver is configured to transmit the offset signals to the h" sensors and to transmit the driving signals to the q-h" sensors, wherein h" is a natural number greater than h and less than q.

7. The sensor device according to claim 3, wherein when the information that the sensor device is placed horizontally is included in the orientation information, during the first period, the sensor driver is configured to transmit the driving signals to the first group of sensors and to transmit the offset signals having a first voltage value to the second group of sensors, and during the second period, the sensor driver is configured to transmit the offset signals having the first voltage value to the first group of sensors and to transmit the driving signals to the second group of sensors.

8. The sensor device according to claim 7, wherein when the information that the sensor device is placed vertically is included in the orientation information, during the first period, the sensor driver configured to transmit the driving signals to the first group of sensors and to transmit offset signals having a second voltage value greater than the first voltage value to the second group of sensors, and during the second period, the sensor driver is configured to transmit the offset signals having the first voltage value to the first group of sensors and to transmit the driving signals to the second group of sensors.

9. The sensor device according to claim 3, wherein when the information that the sensor device is placed horizontally is included in the orientation information, during the first period corresponding to a first time, the sensor driver is configured to transmit the driving signals to the first group of sensors and to transmit the offset signals to the second group of sensors, during the second period corresponding to a second time, the sensor driver is configured to transmit the offset signals to the first group of sensors and to transmit the driving signals to the second group of sensors, and a length of the first time is the same as a length of the second time.

10. The sensor device according to claim 9, wherein when the information that the sensor device is placed vertically is included in the orientation information, during the first period corresponding to a third time, the sensor driver is configured to transmit the driving signals to the first group of sensors and to transmit the offset signals to the second group of sensors, during the second period corresponding to a fourth time, the sensor driver is configured to transmit the offset signals to the first group of sensors and to transmit the driving signals to the second group of sensors, and wherein a length of the third time is shorter than a length of the fourth time, and the length of the fourth time is the same as the length of the second time.

11. A method of operating a sensor device comprising first sensors arranged along a first direction, second sensors arranged along a second direction different from the first direction, and a sensor driver configured to transmit driving signals to the first sensors through first sensor lines and to receive sensing signals from the second sensors through second sensor lines, the method comprising:

receiving orientation information of the sensor device;

determining a mode of the sensor device based on the orientation information; and performing a self-sensing operation of the sensor device based on the mode, wherein performing the self-sensing operation of the sensor device based on the mode comprises:

during a first period, transmitting the driving signals to a first group of sensors from among the first sensors and transmitting offset signals having a frequency that is equal to that of the driving signals and a phase that is different from that of the driving signals to a second group of sensors from among the first sensors, and during a second period, transmitting the offset signals to the first group of sensors and transmitting the driving signals to the second group of sensors, and wherein the sensor driver is configured to generate the driving signals and the offset signals during the first and second periods based on orientation information of the sensor device.

12. The method according to claim 11, wherein when the orientation information indicates that the sensor device is placed horizontally, in determining the mode of the sensor device, it is determined that the sensor device performs the self-sensing operation in a first mode.

13. The method according to claim 12, wherein performing the self-sensing operation of the sensor device based on the mode further comprises:

during the first period, transmitting the driving signals to h sensors from among the first sensors and transmitting the offset signals to q-h sensors from among the first sensors; and during the second period, transmitting the offset signals to the h sensors and transmitting the driving signals to the q-h sensors, wherein h is a natural number greater than 1, and q is a natural number greater than h.

14. The method according to claim 11, wherein when the orientation information indicates that the sensor device is placed vertically, in determining the mode of the sensor device, it is determined that the sensor device performs the self-sensing operation in a second mode.

15. The method according to claim 14, wherein performing the self-sensing operation of the sensor device based on the mode further comprises:

during the first period, transmitting the driving signals to h' sensors from among the first sensors and transmitting the offset signals to q-h' sensors from among the first sensors; and during the second period, transmitting, by the sensor driver, the offset signals to the h' sensors and transmitting the driving signals to the q-h' sensors, and h' is greater than q/2, wherein h' is a natural number greater than 1, and q is a natural number greater than h'.

16. The method according to claim 14, wherein performing the self-sensing operation of the sensor device based on the mode further comprises:

during the second period, transmitting the offset signals having a first voltage value to the first group of sensors and transmitting the driving signals to the second group of sensors, wherein a magnitude of the offset signals transmitted to the second group of sensors during the first period is greater than a magnitude of the offset signals transmitted to the first group of sensors during the second period.

17. The method according to claim 14, wherein performing the self-sensing operation of the sensor device based on the mode further comprises:

during the second period, transmitting the offset signals having a first voltage value to the first group of sensors and transmitting the driving signals to the second group of sensors, wherein a length of the first period is shorter than a length of the second period.

18. A display device comprising:

a plurality of pixels;

first sensors arranged along a first direction;

second sensors arranged along a second direction different from the first direction;

a display driver configured to drive the plurality of pixels; and a sensor driver configured to transmit driving signals to the first sensors through first sensor lines and to receive sensing signals from the second sensors through second sensor lines, wherein the sensor driver is configured to transmit the driving signals to a first group of sensors from among the first sensors, and to transmit offsets signals having a frequency that is equal to that of the driving signals and a phase that is different from that of the driving signals to a second group of sensors from among the first sensors, and wherein the sensor driver is configured to generate the driving signals and the offset signals based on orientation information of the display device.

19. The display device of claim 18, wherein the orientation information comprises information on whether the display device is placed horizontally or vertically in reference to a ground surface.

20. The display device according to claim 19, wherein when the display device is placed horizontally, the sensor driver is configured to transmit the driving signals to h sensors from among the first sensors, and to transmit the offset signals to q-h sensors from among the first sensors, and when the display device is placed vertically, the sensor driver is configured to transmit the driving signals to h' sensors that are less than the h sensors, from among the first sensors, and to transmit the offset signals to q-h' sensors from among the first sensors, wherein h is a natural number greater than 1, h' is a natural number less than h, and q is a natural number greater than h.

* * * * *